US00RE49342E

(19) United States
(12) Reissued Patent
Mimeault

(10) Patent Number: US RE49,342 E
(45) Date of Reissued Patent: Dec. 20, 2022

(54) DISTANCE DETECTION METHOD AND SYSTEM

(71) Applicant: LeddarTech Inc., Quebec (CA)

(72) Inventor: Yvan Mimeault, Québec (CA)

(73) Assignee: LeddarTech Inc., Quebec (CA)

(21) Appl. No.: 16/011,820

(22) Filed: Jun. 19, 2018

Related U.S. Patent Documents

Reissue of:
(64) Patent No.: 8,619,241
Issued: Dec. 31, 2013
Appl. No.: 13/632,191
Filed: Oct. 1, 2012

U.S. Applications:
(60) Continuation of application No. 14/984,704, filed on Dec. 30, 2015, now Pat. No. Re. 46,930, which is an
(Continued)

(51) Int. Cl.
*G01C 3/08* (2006.01)
*G01S 7/487* (2006.01)
(Continued)

(52) U.S. Cl.
CPC ..... *G01S 7/487* (2013.01); *G01S 7/4861* (2013.01); *G01S 7/4865* (2013.01); *G01S 17/10* (2013.01)

(58) Field of Classification Search
CPC . G01S 7/34; G01S 7/282; G01S 7/285; G01S 7/481; G01S 7/483; G01S 7/487;
(Continued)

(56) References Cited

U.S. PATENT DOCUMENTS 3,045,231 A * 7/1962 Lakatos ..... G01S 13/9303 342/29
3,680,085 A 7/1972 Del Signore
(Continued)

FOREIGN PATENT DOCUMENTS

CA 2527895 1/2005
CA 2710212 7/2009
(Continued)

OTHER PUBLICATIONS

Braun et al., "Nanosecond transient electroluminescence from polymer light emitting diodes", Applied Physics Letters, vol. 61(26):3092-3094 (Dec. 1992).

(Continued)

*Primary Examiner* — Christopher E. Lee
(74) *Attorney, Agent, or Firm* — Fish & Richardson P.C.

(57) ABSTRACT

There is provided a system and method for detecting a distance to an object. The method comprises providing a lighting system having at least one pulse width modulated visible-light source for illumination of a field of view; emitting an illumination signal for illuminating the field of view for a duration of time y using the visible-light source at a time t; integrating a reflection energy for a first time period from a time t−x to a time t+x; determining a first integration value for the first time period; integrating the reflection energy for a second time period from a time t+y−x to a time t+y+x; determining a second integration value for the second time period; calculating a difference value between the first integration value and the second integration value; determining a propagation delay value proportional to the difference value; determining the distance to the object from the propagation delay value.

11 Claims, 17 Drawing Sheets

Related U.S. Application Data application for the reissue of Pat. No. 8,619,241, which is a division of application No. 12/809,235, filed as application No. PCT/CA2008/002268 on Dec. 19, 2008, now Pat. No. 8,310,655.

(60) Provisional application No. 61/015,738, filed on Dec. 21, 2007, provisional application No. 61/015,867, filed on Dec. 21, 2007, provisional application No. 61/042,424, filed on Apr. 4, 2008.

(51) Int. Cl.
*G01S 7/4861* (2020.01)
*G01S 7/4865* (2020.01)
*G01S 17/10* (2020.01)

(58) Field of Classification Search
CPC ..... G01S 7/493; G01S 7/497; G01S 7/2926; G01S 7/4811; G01S 13/08; G01S 13/9303; G01S 17/32; G01S 17/36; G01S 17/105; G01S 17/04; G01C 3/08; G02B 5/136; B60K 31/0008; B60Q 1/2603; B60R 21/0134
USPC ..... 180/167, 169; 250/208.1, 559.38, 205; 327/1, 4.01, 4.06, 5.01, 5.03, 5.06, 28, 327/72, 149; 342/70, 110, 118, 135, 137; 362/512; 701/45; 702/159, 69; 356/5.01
See application file for complete search history.

(56) References Cited

U.S. PATENT DOCUMENTS 3,954,335 A * 5/1976 Bodlaj ..... G01S 17/32 356/3.02
4,717,862 A 1/1988 Anderson
4,808,997 A 2/1989 Barkley et al.
4,891,624 A 1/1990 Ishikawa et al.
4,928,232 A 5/1990 Gentile
4,987,832 A 1/1991 Klink et al.
5,102,218 A 4/1992 Min et al.
5,134,393 A 7/1992 Henson
5,179,286 A 1/1993 Akasu
5,298,905 A * 3/1994 Dahl ..... G01S 7/34 342/118
5,317,311 A 5/1994 Martell et al.
5,357,331 A 10/1994 Flockencier
5,381,155 A 1/1995 Gerber
5,389,921 A 2/1995 Whitton et al.
5,396,510 A * 3/1995 Wilson ..... G01S 7/4811 356/28
5,471,215 A * 11/1995 Fukuhara ..... G01S 7/2926 342/70
5,519,209 A 5/1996 Rapoport et al.
5,565,870 A * 10/1996 Fukuhara ..... G01S 7/2926 342/70
5,587,908 A * 12/1996 Kajiwara ..... B60K 31/0008 180/169
5,621,518 A 4/1997 Beller
5,633,629 A 5/1997 Hochstein
5,633,801 A 5/1997 Bottman
5,633,901 A 5/1997 Bottman
5,699,151 A * 12/1997 Akasu ..... G01S 7/483 356/5.01
5,714,754 A 2/1998 Nicholas
5,760,686 A 6/1998 Toman
5,760,887 A 6/1998 Fink et al.
5,764,163 A 6/1998 Waldman et al.
5,777,564 A 7/1998 Jones
5,805,468 A 9/1998 Blohbaum
5,812,249 A 9/1998 Johnson et al.
5,828,320 A 10/1998 Buck
5,838,116 A 11/1998 Katyl et al.
5,852,491 A * 12/1998 Kato ..... G01S 7/4865 356/5.01
5,889,477 A 3/1999 Fastenrath
5,896,190 A 4/1999 Wangler et al.
5,933,225 A * 8/1999 Yamabuchi ..... G01S 7/481 356/5.01
5,942,753 A 8/1999 Dell
5,987,395 A * 11/1999 Donges ..... G01S 13/08 702/149
5,995,900 A 11/1999 Hsiao et al.
6,044,336 A 3/2000 Marmarelis et al.
6,094,159 A 7/2000 Osterfeld et al.
6,100,539 A * 8/2000 Blumcke ..... G01S 17/32 250/559.38
6,104,314 A 8/2000 Jiang
6,107,942 A 8/2000 Yoo et al.
6,115,112 A * 9/2000 Hertzman ..... G01S 7/487 356/5.01
6,115,113 A 9/2000 Flockencier
6,142,702 A 11/2000 Simmons
6,147,624 A 11/2000 Clapper
6,166,645 A 12/2000 Blaney
6,252,655 B1 * 6/2001 Tanaka ..... G01S 7/487 356/5.01
6,259,515 B1 7/2001 Benz et al.
6,259,862 B1 7/2001 Marino et al.
6,266,609 B1 7/2001 Fastenrath
6,285,297 B1 9/2001 Ball
6,340,935 B1 1/2002 Hall
6,377,167 B1 4/2002 Juds et al.
6,404,506 B1 6/2002 Cheng et al.
6,411,221 B2 6/2002 Hörber
6,417,783 B1 7/2002 Gabler et al.
6,426,708 B1 7/2002 Trajkovic et al.
6,502,011 B2 12/2002 Haag
6,502,053 B1 12/2002 Hardin et al.
6,516,286 B1 2/2003 Aebischer et al.
6,548,967 B1 4/2003 Dowling et al.
6,556,916 B2 4/2003 Waite et al.
6,559,776 B2 5/2003 Katz
6,587,185 B1 * 7/2003 Ide ..... G01S 7/484 327/1
6,606,054 B2 * 8/2003 Okamura ..... G01S 13/103 342/118
6,642,854 B2 11/2003 McMaster
6,650,403 B2 * 11/2003 Ogawa ..... G01S 17/105 180/169
6,657,704 B2 * 12/2003 Shirai ..... G01S 17/36 342/135
6,665,057 B2 * 12/2003 Schellmann ..... G01S 7/497 180/167
6,665,250 B1 12/2003 Minamino et al.
6,665,621 B2 12/2003 Drinkard et al.
6,710,859 B2 * 3/2004 Shirai ..... G01S 7/484 180/169
6,753,766 B2 6/2004 Patchell
6,753,950 B2 6/2004 Morcom
6,765,495 B1 7/2004 Dunning et al.
6,771,185 B1 8/2004 Yoo et al.
6,794,831 B2 9/2004 Leeb et al.
6,825,778 B2 11/2004 Bergan et al.
6,829,043 B2 * 12/2004 Lewis ..... G01S 7/4811 356/5.06
6,831,576 B2 12/2004 Geiger et al.
6,836,317 B1 12/2004 Perger
6,842,231 B2 1/2005 Nourrcier et al.
6,850,156 B2 2/2005 Bloomfield et al.
6,885,311 B2 4/2005 Howard et al.
6,885,312 B1 4/2005 Kirkpatrick
6,897,465 B2 * 5/2005 Remillard ..... G02B 5/136 250/559.38
6,917,307 B2 7/2005 Li
6,927,700 B1 8/2005 Quinn
6,946,974 B1 9/2005 Racunas Jr.
6,989,781 B2 * 1/2006 Steinbuch ..... G01S 7/282 342/137
7,023,531 B2 * 4/2006 Gogolla ..... G01S 7/497 356/5.01

(56) References Cited

U.S. PATENT DOCUMENTS 7,026,954 B2 4/2006 Slemmer et al.
7,068,214 B2 * 6/2006 Kakishita ..... G01S 7/285 342/118
7,081,832 B2 7/2006 Nelson et al.
7,106,214 B2 9/2006 Jesadanont et al.
7,116,246 B2 10/2006 Winter et al.
7,119,674 B2 10/2006 Sefton
7,119,715 B2 10/2006 Orita
7,123,166 B1 10/2006 Haynes et al.
7,135,991 B2 11/2006 Slemmer et al.
7,148,813 B2 12/2006 Bauer
7,177,014 B2 * 2/2007 Mori ..... G01S 17/36 356/5.01
7,221,271 B2 5/2007 Reime
7,236,102 B2 6/2007 Shimotani
7,250,605 B2 7/2007 Zhevelev et al.
7,253,747 B2 8/2007 Noguchi
7,317,384 B2 1/2008 Lefranc
7,321,317 B2 1/2008 Nath
7,350,945 B2 4/2008 Albou et al.
7,352,972 B2 4/2008 Franklin
7,405,676 B2 7/2008 Janssen
7,417,718 B2 8/2008 Wada et al.
7,426,450 B2 9/2008 Arnold et al.
7,486,204 B2 2/2009 Quintos
7,573,400 B2 8/2009 Arnold et al.
7,957,900 B2 6/2011 Chowdhary et al.
8,310,655 B2 11/2012 Mimeault
8,619,241 B2 12/2013 Mimeault
2001/0024271 A1 * 9/2001 Takayanagi ..... G01C 3/08 356/5.01
2003/0154017 A1 8/2003 Ellis
2003/0189500 A1 10/2003 Lim
2004/0035620 A1 2/2004 McKeefery
2004/0083035 A1 4/2004 Ellis
2004/0135992 A1 7/2004 Munro
2004/0233416 A1 11/2004 Doemens et al.
2005/0046597 A1 3/2005 Hutchison et al.
2005/0117364 A1 6/2005 Rennick et al.
2005/0187701 A1 8/2005 Baney
2005/0225478 A1 10/2005 Nakamura
2005/0231384 A1 10/2005 Shimotani
2005/0269481 A1 * 12/2005 David et al. ..... G01S 7/484 250/208.1
2005/0270175 A1 12/2005 Peddie et al.
2006/0033641 A1 2/2006 Jaupitre et al.
2006/0072099 A1 * 4/2006 Hoashi ..... G01S 7/487 356/4.01
2006/0145824 A1 7/2006 Frenzel et al.
2006/0147089 A1 7/2006 Han et al.
2006/0149472 A1 7/2006 Han et al.
2006/0180670 A1 8/2006 Acosta et al.
2006/0192938 A1 8/2006 Kawahito
2006/0274545 A1 * 12/2006 Rosenstein ..... B60Q 1/2603 362/512
2007/0018106 A1 1/2007 Zhevelev et al.
2007/0024841 A1 * 2/2007 Kloza ..... G01S 7/4811 356/5.03
2007/0061192 A1 3/2007 Chew
2007/0091294 A1 4/2007 Hipp
2007/0096943 A1 5/2007 Arnold et al.
2007/0097349 A1 * 5/2007 Wada ..... G01S 7/493 356/4.06
2007/0187573 A1 * 8/2007 Aoki ..... G01S 17/04 250/205
2007/0205918 A1 9/2007 Riesco Prieto et al.
2007/0222639 A1 9/2007 Giles et al.
2007/0228262 A1 10/2007 Cantin et al.
2007/0255525 A1 * 11/2007 Lee ..... G01S 17/10 702/159
2008/0006762 A1 1/2008 Fadell et al.
2008/0046150 A1 * 2/2008 Breed ..... B60R 21/0134 701/45
2009/0059201 A1 * 3/2009 Willner ..... G01S 17/894 356/5.01
2009/0102699 A1 4/2009 Behrens et al.
2009/0119044 A1 * 5/2009 Levesque ..... G01S 7/484 702/69
2009/0251680 A1 10/2009 Farsaie
2009/0299631 A1 12/2009 Hawes et al.
2011/0134249 A1 6/2011 Wood et al.
2011/0301914 A1 12/2011 Maltseff

FOREIGN PATENT DOCUMENTS

DE 4133196 C2 8/1997
DE 19604338 7/2004
DE 102004035856 3/2005
DE 102006025020 11/2007
DE 202008007078 9/2008
DE 102009013841 9/2009
EP 0318260 5/1989
EP 0424097 A1 4/1991
EP 0476562 3/1992
EP 0494815 7/1992
EP 0838695 10/1997
EP 0866434 2/1998
EP 0612049 9/1998
EP 0988624 3/1999
EP 0912970 4/2000
EP 1034522 9/2000
EP 1188067 A1 12/2000
EP 0798684 1/2001
EP 1296302 6/2002
EP 1224632 7/2002
EP 0779990 3/2003
EP 0935764 3/2003
EP 1435036 4/2003
EP 0789342 6/2003
EP 0784302 9/2003
EP 1611458 7/2004
EP 1521226 6/2006
EP 1049064 9/2006
EP 1832897 A1 * 9/2007 ..... G01S 17/87
EP 1997090 9/2007
EP 2136550 6/2009
EP 1048961 7/2009
FR 2690519 10/1992
GB 2264411 8/1993
GB 2354898 4/2001
GB 2431498 4/2007
GB 2445767 7/2008
JP 04-145391 5/1992
JP 04145390 5/1992
JP 04145391 5/1992
JP 04-172285 6/1992
JP 07-280940 10/1995
JP 07-333339 12/1995
JP 912723 5/1997
JP 9-178786 7/1997
JP 09178786 7/1997
JP 09222476 A * 8/1997
JP 10-170652 6/1998
JP 10-171497 6/1998
JP 11101637 A * 4/1999
JP 2000149161 5/2000
JP 2002181934 6/2002
JP 2002372578 12/2002
JP 2004102889 4/2004
JP 2004538491 12/2004
JP 2005170184 6/2005
JP 2005300233 10/2005
JP 2005331468 12/2005
JP 2006172210 6/2006
JP 2006226931 8/2006
JP 2006521536 9/2006
JP 2007121116 5/2007
JP 2007132848 5/2007
JP 2007248227 9/2007
JP 4-145390 6/2008
JP 09178786 8/2009
JP 2010538303 12/2010

(56) References Cited

FOREIGN PATENT DOCUMENTS

| | | | | |
|---|---|---|---|---|
| JP | 2014194950 | | 10/2014 | |
| JP | 2016121676 | | 7/2016 | |
| JP | 2002059608 | | 2/2022 | |
| WO | 8705138 | | 8/1987 | |
| WO | WO-9107672 | A2 * | 5/1991 | ..... G01S 17/936 |
| WO | 9203808 | | 3/1992 | |
| WO | 9634252 | | 10/1996 | |
| WO | 0139153 | | 5/2001 | |
| WO | 0215334 | | 2/2002 | |
| WO | 02057714 | A1 | 7/2002 | |
| WO | 03007269 | | 1/2003 | |
| WO | 2004100103 | | 11/2004 | |
| WO | 2005008271 | | 1/2005 | |
| WO | WO2005008271 | | 1/2005 | |
| WO | 2006044758 | | 4/2006 | |
| WO | 2006092659 | | 9/2006 | |
| WO | 2006061572 | A1 | 5/2007 | |
| WO | 2007071032 | | 6/2007 | |
| WO | 2009079789 | A1 | 7/2007 | |
| WO | 2007096814 | | 8/2007 | |
| WO | 2009117197 | | 9/2007 | |
| WO | 2008037049 | | 4/2008 | |
| WO | 2008154737 | | 12/2008 | |
| WO | 2009013739 | | 1/2009 | |
| WO | 2007026779 | | 3/2009 | |
| WO | 2009087536 | | 7/2009 | |
| WO | 2009104955 | | 8/2009 | |

OTHER PUBLICATIONS

Hussain, "Infrared Vehicle Sensor for Traffic Control," Thesis for Doctorate City University of New York, Dissertation Abstracts International, vol. 55-07, Section A, p. 2176, 1994.

Loukakos, Active Laser Infrared Detectors, Intelligent Transportation Systems, Traffic Surveillance, California Center for Innovative Transportation at the University of California, Dec. 20, 2001, 6 pages.

VTU elearning, "Architecture for Programmable Digital Signal Processing Devices", DSP Algorithms and Architecture, Subject code 06EC74, part A, Unit 2, 24 pages.

Akindinov et al., "Detection of Light Pulses Using an Avalanche-Photodiode Array with a Metal-Resistor-Semiconductor Structure", Instruments and Experimental Techniques, May 2005, 48(3)1355-363.

Braun et al., "Nanosecond transient electroluminescence from polymer light-emitting diodes", Applied Physics Letters, Dec. 1992, 61(26):3092-3094.

digitalsignallabs.com [online], "Practical Considerations in Fixed-Point FIR Filter Implementations", Sep. 2010, retrieved on May 25, 2022, retrieved from URL<http://www.digitalsignallabs.com/fir.pdf>,15 pages.

The Vehicle Detector Cleaninghouse, "A summary of vehicle detection and surveillance technologies used in intelligent transportation systems", Fall 2000, Southwest Technology Development Institute (SWTDI) at New Mexico State University (NMSU), 211 pages.

Kon Tayfun, "Collision Warning and Avoidance System for Crest Vertical Curves", Thesis for the degree of Master in Science, Virginia Tech, May 1998, Appendix B2, pp. 51-92.

Traffic Detector Handbook, 3rd ed., Klein, Oct. 2006, Chapter 2, 104 pages.

Lawrence A. Klein, Vehicle Detector Technologies for Traffic Management Applications, Part 1, Colorado Department of Transportation, Intelligent Transportation Systems (ITS), 1997.

Hussain, Tarik Mustafa, City University of New York, Infrared Vehicle Sensor for Traffic Control, Thesis (PHD) City University of New York, Dissertation Abstracts International, vol. 55-07, Section A, p. 2176, 1994.

Dimitri Loukakos, Active Laser Infrared Detectors, Intelligent Transportation Systems, Traffic Surveillance, California Center for Innovative Transportation at the University of California, Dec. 20, 2001.

Office Action in European Appln. No. 08863916.6 dated Sep. 19, 2013, 5 pages.

Decision to Grant in Japanese Appln. No. 2016-121676 dated Oct. 18, 2018, 3 pages (English Translation).

Office Action in U.S. Appl. No. 12/809,235, dated Jul. 6, 2012, 10 pages.

Notice of Allowance in U.S. Appl. No. 12/809,235, dated Aug. 9, 2012, 7 pages.

Examiner's Report in Canadian Appln. No. 2,710,212, dated Jan. 20, 2014, 2 pages.

Supplementary European Search Report in European Appln. No. 08863916.6 dated Sep. 11, 2013, 4 pages.

Office Action in European Appln. No. 08863916.6 dated Sep. 11, 2013, 5 pages.

Intention to Grant in European Appln. No. 08863916.6 dated Oct. 27, 2016, 5 pages.

Decision to Grant in European Appln. No. 08863916.6, dated Mar. 9, 2017, 2 pages.

Search Report in European Appln. No. 17162120.4, dated Jun. 21, 2017, 2 pages.

Office Action in European Appln. No. 17162120.4, dated Jun. 21, 2017, 5 pages.

Office Action in European Appln. No. 17162120.4 dated Oct. 2, 2018, 3 pages.

Intention to Grant in European Appln. No. 17162120.4 dated Mar. 25, 2021, 5 pages.

Decision to grant in European Appln. No. 17162120.4 dated Jul. 29, 2021, 2 pages.

Notice of Allowance in U.S. Appl. No. 12/809,235, dated Aug. 9, 2012, 5 pages.

Supplemental Notice of Allowability in U.S. Appl. No. 12/809,235, dated Sep. 28, 2012, 2 pages.

Office Action in U.S. Appl. No. 13/632,191, dated May 13, 2013, 6 pages.

Notice of Allowance U.S. Appl. No. 13/632,191, dated Aug. 30, 2013, 6 pages.

Office Action in U.S. Appl. No. 14/984,704, dated Jun. 15, 2017, 13 pages.

Notice of Allowance in U.S. Appl. No. 14/984,704, dated Mar. 8, 2018, 9 pages.

International Preliminary Report on Patentability in International Appln. No. PCT/CA2008/002268, dated Jun. 22, 2010, 6 pages.

Written Opinion of the International Searching Authority in International Appln. No. PCT/CA2008/002268, dated Jun. 21, 2010, 5 pages.

Search Report in Japanese Appln. No. 2010-538303, dated Apr. 25, 2013, 23 pages (English Translation).

Notice of Reasons for Refusal in Japanese Appln. No. 2010-538303, dated May 8, 2013, 4 pages (English Translation).

Decision of Refusal in Japanese Appln. No. 2010-538303, dated May 28, 2014, 4 pages (English Translation).

Notice of Reasons for Refusal in Japanese Appln. No. 2010-538303, dated Nov. 10, 2014, 4 pages (English Translation).

Decision to Grant in Japanese Appln. No. 2010-538303, dated Dec. 8, 2014, 3 pages (English Translation).

Search Report in Japanese Appln. No. 2014-194950, dated Jul. 21, 2015, 24 pages (English Translation).

Notice of Reasons for Refusal in Japanese Appln. No. 2014-194950, dated Jul. 27, 2015, 7 pages (English Translation).

Notice of Reasons for Refusal in Japanese Appln. No. 2014-194950, dated Mar. 22, 2016, 4 pages (English Translation).

Decision to Grant a Patent in Japanese Appln. No. 2014-194950, dated Sep. 7, 2016, 3 pages (English Translation).

Notice of Reasons for Refusal in Japanese Appln. No. 2016-121676, dated Jul. 3, 2017, 7 pages (English Translation).

Notice of Reasons for Refusal in Japanese Appln. No. 2016-121676, dated May 1, 2018, 4 pages (English Translation).

FHWA.dot.gov [online], "Detailed Monitoring Protocol," upon information and belief, available no later than Oct. 25, 2011, retrieved on Nov. 29, 2021, retrieved from URL <https://www.fhwa.dot.gov/environment/air_quality/air_toxics/research_and_analysis/near_road_study/protocol/protocol04.cfm>, 7 pages.

(56) References Cited

OTHER PUBLICATIONS

Akindinov et al., "Detection of Light Pulses Using an Avalanche-Photodiode Array with a Metal-Resistor-Semiconductor Structure", Instruments and Experimental Techniques, Nov. 2004, vol. 48, No. 3 205, pp. 355-363, Russia.
Braun et al., "Nanosecond transient electroluminescence from polymer lightemitting diodes", Applied Physics Letters Dec. 1992, vol. 61, No. 26, pp. 3092-3094, California.

* cited by examiner

Source 50KHz

ADC 50MSPS

| Range (m) | 1/R2 | Shift step | Refresh Rate | Resolution (m) | Accumulation | S/N | Gain |
|---|---|---|---|---|---|---|---|
| 1 | 100.00 | 128 | 100 | 0.02 | 4 | 70.71 | 0.71 |
| 10 | 1.00 | 64 | 100 | 0.05 | 8 | 1.00 | 1.00 |
| 20 | 0.25 | 32 | 100 | 0.09 | 16 | 0.35 | 1.41 |
| 30 | 0.11 | 16 | 100 | 0.19 | 31 | 0.22 | 2.00 |
| 40 | 0.06 | 16 | 50 | 0.19 | 63 | 0.18 | 2.83 |
| 50 | 0.04 | 8 | 50 | 0.38 | 125 | 0.16 | 4.00 |
| 60 | 0.03 | 8 | 50 | 0.38 | 125 | 0.11 | 4.00 |
| 70 | 0.02 | 4 | 25 | 0.75 | 500 | 0.16 | 8.00 |
| 80 | 0.02 | 4 | 25 | 0.75 | 500 | 0.13 | 8.00 |
| 90 | 0.01 | 2 | 10 | 1.50 | 2500 | 0.22 | 17.89 |
| 100 | 0.01 | 2 | 10 | 1.50 | 2500 | 0.18 | 17.89 |

Figure 3

Optical pulse
Frequency: 100KHz
Width: 20ns

| Max Range (m) | Time for reflected back signal (ns) | Shift step (ns) | Number of step | Refresh Rate (Hz) | Accumulation | S/N improvement by acuumulation |
|---|---|---|---|---|---|---|
| 10 | 85 | 1 | 85 | 1 | 1176 | 34 |
| 10 | 85 | 1 | 85 | 10 | 118 | 11 |
| 10 | 85 | 5 | 17 | 1 | 5882 | 77 |
| 10 | 85 | 5 | 17 | 10 | 588 | 24 |
| 30 | 215 | 1 | 215 | 1 | 465 | 22 |
| 30 | 215 | 1 | 215 | 10 | 47 | 7 |
| 30 | 215 | 5 | 43 | 1 | 2326 | 48 |
| 30 | 215 | 5 | 43 | 10 | 233 | 15 |

Figure 7

DISTANCE DETECTION METHOD AND SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a reissue continuation application of and claims priority to U.S. application Ser. No. 14/984,704, filed on Dec. 30, 2015, issued as U.S. Pat. No. RE46,930. U.S. application Ser. No. 14/984,704, issued as U.S. Pat. No. RE46,930, is a reissue application based on U.S. application Ser. No. 13/632,191, filed on Oct. 1, 2012, which previously issued as U.S. Pat. No. 8,619,241. U.S. application Ser. No. 13/632,191 is a divisional of U.S. application Ser. No. 12/809,235, filed Jun. 18, 2010, now U.S. Pat. No. 8,310, 655, which is the U.S. national phase of International Application No. PCT/CA2008/002268, which claims priority to U.S. Provisional Application Ser. No. 61/015,738, filed Dec. 21, 2007, U.S. Provisional Application Ser. No. 61/015, 867, filed Dec. 21, 2007, and U.S. Provisional Application Ser. No. 61/042,424, filed Apr. 4, 2008.*

TECHNICAL FIELD

The invention relates to methods and systems for improving the measurement of light transit time reflected by different types of objects in detection and ranging methods and systems.

BACKGROUND OF THE ART

Several methods are used to measure the distance between an apparatus and an object. Optical range-finding systems frequently rely on the time-of-flight principle and determine the distance between the apparatus and the object by measuring the time a short pulse of light emitted from the apparatus takes to reach an object and be reflected to a photo-detection circuit. Conventional optical rangefinders use a counter initiated at the starting pulse and then stopped when the receiver circuit detects the pulse echo of a value higher than a specific threshold. This threshold can be set low to provide sensitivity but the system will generate false alarms from transient noise. It can be set high to avoid false alarms but the system will not detect objects that return weak signal reflection. In bad weather conditions, such as rain or snow, several pulse echoes can be generated. Some techniques help to detect a certain number of echoes and may be used the reject some reflections but they have their limitations.

Some optical rangefinders use other methods to be more robust against false alarms. One method is based on the use of an analog-to-digital converter (ADC) for the digitalization of the waveform of the echoed back signal. Once digitalized, the waveform can be processed by digital signal processing circuits to improve the performance of the system.

Several techniques are already known for improving the performance of an optical rangefinder using an ADC. Averaging is an efficient way to improve the signal to noise ratio (SNR). However, averaging has an impact on response time and may render the system too slow for some applications.

The resolution of distance measurement can be enhanced by using a clock pulsed delay circuit technique. Using an integer (N) division of the clock pulse signal with a delay circuit and by rearranging each echo light pulse sample data, this technique improves the resolution by a factor N. However, this technique has an impact on the number of averages if the averaging technique is also used to improve the SNR.

Digital correlation is another digital processing technique for increasing the resolution of the range measurement. By correlating the echo pulse signal with a pre-stored waveform, the distance to the object can be estimated by using the peak value of the result of the correlation function.

Several digital processing techniques have been elaborated to improve the performance of rangefinders but none consider that the need, in terms of resolution and signal to noise improvement, is not constant as a function of the range for most of range-finding applications.

SUMMARY

It is therefore an aim of the present invention to address at least one of the above mentioned difficulties The present system improves the detection of the presence and the measure of the distance of objects, while optimizing the performance (resolution, repetition rate, etc) by adapting a range-dependant processing as a function of the need of different applications.

The present system can be adapted for use with a lighting system for lighting purposes as well as for the detection and ranging purposes.

The present system also improves the detection of rain, snow, fog, smoke and can provide information about current weather conditions.

According to a broad aspect of the present invention, there is provided a method for detecting a distance to an object. The method comprises providing a lighting system having at least one pulse width modulated visible-light source for illumination of a field of view; emitting an illumination signal for illuminating the field of view for a duration of time y using the visible-light source at a time t; integrating a reflection energy for a first time period from a time t−x to a time t+x; determining a first integration value for the first time period; integrating the reflection energy for a second time period from a time t+y−x to a time t+y+x; determining a second integration value for the second time period; calculating a difference value between the first integration value and the second integration value; determining a propagation delay value proportional to the difference value; determining the distance to the object from the propagation delay value.

BRIEF DESCRIPTION OF THE DRAWINGS

Having thus generally described the nature of the invention, reference will now be made to the accompanying drawings, showing by way of illustration a preferred embodiment thereof and in which:

FIG. 2 shows an example of a reflected signal with accumulation and phase shift techniques wherein

FIG. 3 is a table of example setup parameters for the segmentation;

FIG. 7 is a table of example setup configuration for the accumulation and phase shift technique using the one sample by optical pulse technique;

It will be noted that throughout the appended drawings, like features are identified by like reference numerals.

DETAILED DESCRIPTION

Figure 1:
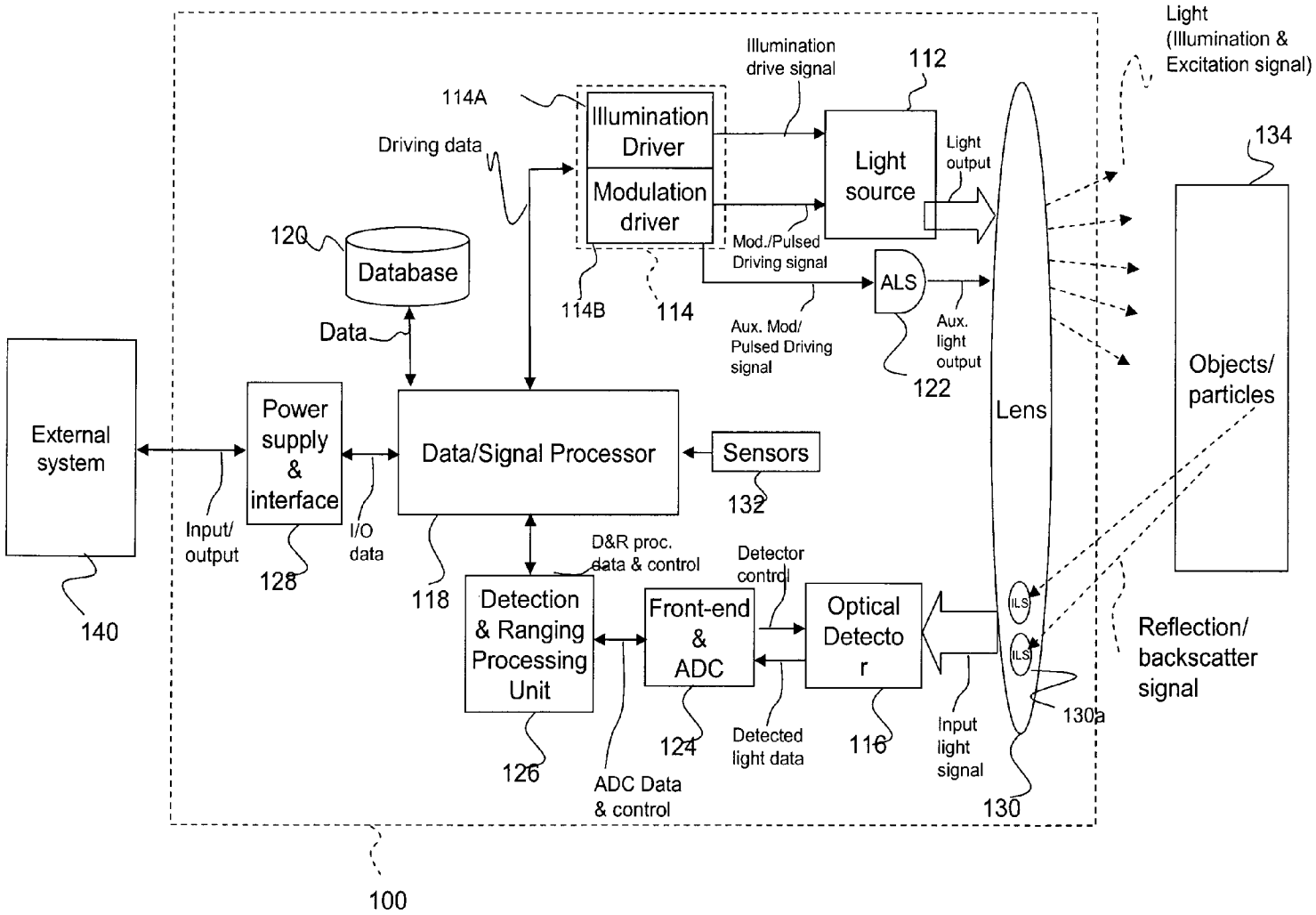
FIG. 1 is a block diagram of an embodiment of the lighting system.

FIG. 1 is a block diagram illustrating an embodiment of a lighting system equipped with the present system. The lighting system 100 has a visible-light source 112. The visible-light source [12] *112* has, as a first purpose, the emission of visible light for illumination or visual communication of information, like signaling, for human vision. The primary purpose of emitting light is controlled according to specific criteria like optical power, field of view and light color, to meet requirements defined through a number of regulations. In the preferred embodiment, the visible-light source 112 has one or more solid-state lighting devices, LEDs or OLEDs for instance.

The visible-light source 112 is connected to a source controller 114, so as to be driven into producing visible light. In addition to emitting light, the system 100 performs detection of objects and particles (vehicles, passengers, pedestrians, airborne particles, gases and liquids) when these objects are part of the environment/scene illuminated by the light source 112. Accordingly, the source controller 114 drives the visible-light source 112 in a predetermined mode, such that the emitted light takes the form of a light signal, for instance by way of amplitude-modulated or pulsed light emission.

These light signals are such that they can be used to provide the lighting illumination level required by the application, through data/signal processor 118 and source controller 114, while producing a detectable signal. Accordingly, it is possible to obtain a light level equivalent to a continuous light source by modulating the light signal fast enough (e.g., frequency more than 100 Hz) to be generally imperceptible to the human eye and having an average light power equivalent to a continuous light source.

In an embodiment, the source controller 114 is designed to provide an illumination drive signal, such as a constant DC signal or a pulse-width modulated (PWM) signal, that is normally used in lighting systems to produce the required illumination and control its intensity. The illumination drive signal is produced by the illumination driver sub-module 114A of the controller 114.

A modulated/pulsed driving signal supplies the fast modulation/pulse sequence required for remote object detection. This modulated/pulsed drive signal is produced by a modulation driver sub-module 114B of the controller 114. The amplitude of short-pulse (typ. <50 ns) can be several time the nominal value while the duty cycle is low (typ. <0.1%).

The modulator driver 114B can also be used to send data for optical communication. Both driving signals can be produced independently or in combination. Sequencing of the drive signals is controlled by the data/signal processor 118. The light source 112 can be monitored by the optical detector 116 and the resulting parameters sent to the data/signal processor 118 for optimization of data processing.

An alternative for sourcing the light signal for detection involves an auxiliary light source (ALS) 122, which can be a visible or non-visible source (e.g., UV or IR light, LEDs or laser) using the modulation driver [14B] *114B*. The auxiliary light source 122 provides additional capabilities for detecting objects and particles. UV light source (particularly around 250 nm) can be used to limit the impact of the sunlight when used with a UV detector. IR light can be used to increase the performance and the range of the detection area. IR lights and other types of light can be used to detect several types of particles by selecting specific wavelengths. The auxiliary light source 122 can also be useful during the installation of the system by using it as a pointer and distance meter reference. It can also be used to determine the condition of the lens.

The visible-light source 112 is preferably made up of LEDs. More specifically, LEDs are well suited to be used in the lighting system 100 since LED intensity can be efficiently modulated/pulsed at suitable speed. Using this feature, current lighting systems already installed and featuring LEDs for standard lighting applications can be used as the light source 112 for detection applications, such as presence detection for energy savings, distance and speed measurements, fog, rain, snow or smoke detection and spectroscopic measurements for gas emission or smog detection.

The system 100 has at least one lens 130 through which light is emitted in an appropriate way for specific applications. At least one input lens section 130a of at least one lens 130 is used for receiving the light signal, for instance reflected or diffused (i.e., backscattered) by the objects/particles 134. This input lens section 130a can be at a single location or distributed (multiple zone elements) over the lens 130 and have at least one field of view. Several types of lens 130 can be used, such as Fresnel lenses for example. A sub-section of the lens 130 can be used for infrared wavelength. A sub-section of the lens 130 can be used for optical data reception.

A detector 116 is associated with the visible-light source 112 and/or auxiliary light source 122 and the lens 130. The detector module 116 is an optical detector (or detectors)

provided so as to collect light emitted by the light source 112/ALS 122 and back-scattered (reflected) by the objects/particles 134. Detector module 116 can also monitor the visible-light source 112 or auxiliary light source 122. The light signal can also come from an object 134 being the direct source of this light (such as a remote control) in order to send information to the data/signal processor through the optical detector module 116. The optical detector module 116 is, for example, composed of photodiodes, avalanche photodiodes (APD), photomultipliers (PMT), complementary metal-oxide semiconductor (CMOS) or charge-coupled device (CCD) array sensors.

Filters are typically provided with the detector module 116 to control background ambient light emitted from sources other than the lighting system 100. Filters can also be used for spectroscopic measurements and to enhance performance of the light source 112.

A front-end and analog-to-digital converter (ADC) 124 is connected to detector 116 and receives detected light data therefrom and controls the detector 116. For instance, adjusting the Vbias of an APD detector can be one of the detector controls to optimize the gain of the receiver section for an Automatic Gain Control (AGC). Analog filters can be used for discriminating specific frequencies or to measure the DC level.

A detection and ranging digital processing unit 126 is connected to the front-end 124, and controls parameters such as gain of amplifier, synchronization and sample rate of the ADC. The detection and ranging digital processing unit 126 receives data from ADC and pre-processes the data.

The data/signal processor 118 is connected to the detection and ranging processing module 126 and receives pre-processed data. The data/signal processor 118 is also connected to the source controller 114, so as to receive driving data therefrom. The data/signal processor 118 has a processing unit (e.g., CPU) so as to interpret the pre-processed data from the detection module 126, in comparison with the driving data of the source controller 114, which provides information about the predetermined mode of emission of the light signals emitted by the visible-light source 112.

Accordingly, information about the object (e.g., presence, distance, speed of displacement, composition, dimension, etc.) is calculated by the data/signal processor 118 as a function of the relationship (e.g., phase difference, relative intensity, spectral content, time of flight, etc.) between the driving data and the detected light data, is optionally pre-processed by the front-end and ADC [24] *124* and the detection and ranging processing unit 126. A database 120 may be provided in association with the data/signal processor 118 so as to provide historical data or tabulated data to accelerate the calculation of the object parameters.

In view of the calculation it performs, the data/signal processor 118 controls the source controller 114 and thus the light output of the visible-light source 112. For instance, the visible-light source 112 may be required to increase or reduce its intensity, or change the parameters of its output. For example, changes in its output power can adapt the lighting level required in daytime conditions versus night-time conditions or in bad visibility conditions such as fog, snow or rain.

The system 100 can be provided with sensors 132 connected to the data/signal processor 118. Sensors 132 can be an inclinometer, accelerometer, temperature sensor, day/night sensors, etc. Sensors 132 can be useful during the installation of the system and during operation of the system. For example, data from an inclinometer and accelerometer can be used to compensate for the impact on the field of view of an effect of the wind or any kind of vibration. Temperature sensors are useful to provide information about weather (internal, external or remote temperature with FIR lens). Information from sensors 132 and data/signal processor 118 and light from light source 112 and auxiliary light source 122 can be used during installation, in particular for adjusting the field of view of the optical receiver. The auxiliary light source [112] *122* can be used as a pointer and distance meter.

The system 100 has a power supply and interface 128. The interface section is connected to a Data/signal processor and communicates to an external traffic management system *140* (via wireless, power line, Ethernet, CAN bus, USB, etc.).

Segmentation of the Digital Processing as a Function of the Range

Several range finding applications need different performances as a function of the range. For automotive applications, such as Adaptive Cruise Control (ACC), it could be useful to detect a vehicle more than 100 meters ahead but the needs in terms of accuracy and repetition rate are not the same as for short range applications such as pre-crash mitigation. Basically, for a short range application, the reflected signal is strong but, usually, the needs for a good resolution and fast refresh rate of the data are high. For a long range application, the opposite is true, the reflected signal is weak and noisy but the need for resolution and refresh rate is less demanding.

Phase shifting control techniques can improve accuracy using a digital acquisition system with low sample rate. For instance, a relatively low cost ADC (ex.: 50 MSPS) can have an improved temporal resolution if successive acquisitions are delayed by an equivalent fraction of the acquisition time period but this technique has an impact on SNR and refresh rate when averaging is used.

To optimize the performance, one can adjust specific parameters as a function of the distance. Using the detection and ranging digital processing unit 126 and the Data/signal Processor 118, allows to control the number of shift delay by period, the number of accumulation and the refresh rate for each data point sampled or for several segments. For shorter distances, with an echo back signal which is relatively strong, the number of shift delays and the refresh rate can be higher to improve the resolution and the response time. The number of accumulation (or other time-integration techniques) would be lower but sufficient at short distances (trade-off between signal-to-noise ratio, resolution and number of results per second).

The accumulation technique improves the signal-to-noise ratio of the detected light signal using multiple measurements. In order to produce one distance measurement, the technique uses M light pulses and for each light pulse, a signal detected by the optical detector is sampled by the ADC with an ADC time resolution of 1/F second thereby generating M lidar traces of j points ($S_1$ to $S_j$) each. Points of the M lidar traces are added point per point to generate one accumulated digital lidar trace of j points.

The phase shift technique is used to improve the time resolution of the trace acquired by the ADC and limited by its sample rate F Hz. The phase shift technique allows for the use of a low cost ADC having a low sample rate F by virtually increasing the effective sample rate. The effective sample rate is increased by a factor P by acquiring P sets corresponding to P light pulses while shifting the phase between the emitted light pulse and the ADC sampling rate. The phase shifting between each acquisition corresponds to $2\pi/P$. The P sets obtained are then combined in a single trace by interleaving the P sets such that the resulting trace is equivalent to a single measurement with a temporal resolution (1/F×P) second.

Figure 2A:
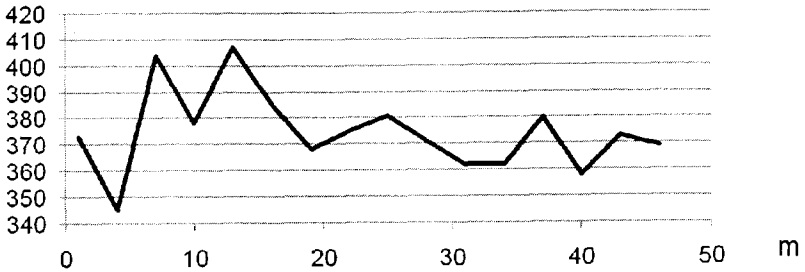
FIG. 2a is a trace obtained with no accumulation and no phase shift, FIG. 2b has accumulation and phase shift improvements and FIG. 2c has a greater number of accumulations and phase shifts.
Figure 2B:
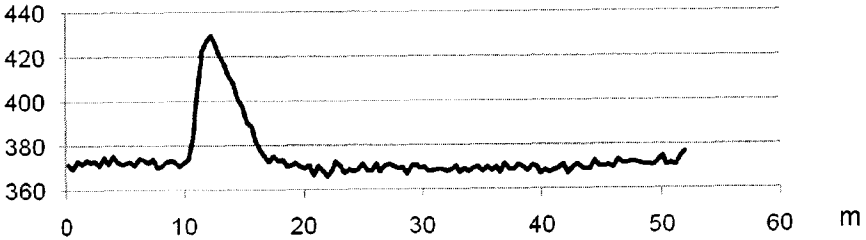
Figure 2C:
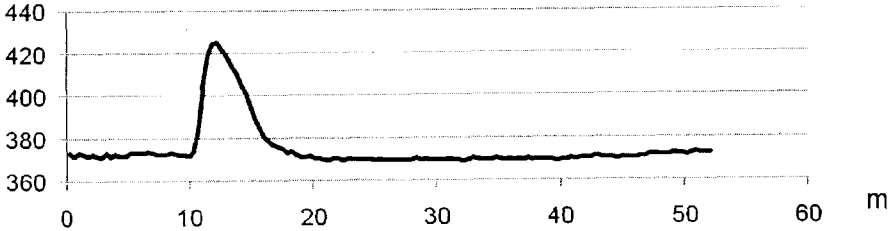

By combining the accumulation and the phase shift techniques, an accumulation of M sets is performed for each one of the P phase shifts, for a total of N=M×P acquisition sets. Using the N sets, the detection and ranging digital processing unit 126 and the Data/signal Processor 118 creates one combined trace of the reflected light pulse. Each point in the combined trace is an accumulation of M=N/P sets and the effective time resolution of the combined trace is 1/(F×P) second. To store one complete trace, the length of the buffer is at least j×P elements and the number of bit of each element is a function of the resolution of the ADC (number of bits, B) and the number of accumulations M. To prevent overflow, each element of the buffer should have at least $B+\log_2 M$ bits. Example results of the accumulation and phase shift techniques are shown in FIGS. 2a, 2b and 2c. For that experimentation, a target is approximately at a distance of 12 meters and the system use an ADC at 50 MSPS. FIG. 2a shows a trace obtained with no accumulation and no phase shift. The signal is noisy with a lack of resolution and it is very difficult to identify the target. FIG. 2b shows an improvement in terms of signal to noise ratio by accumulating 64 sets with 8 shift delays. Finally, FIG. 2c shows how an accumulation of 1024 sets with 256 shift delays can improve the signal-to-noise ratio and resolution.

Accumulation and shift control can be done by a programmable logic, a Field Programmable Gate Array (FPGA) for example. Phase shifting can be controlled by delaying the clock of the ADC converter 130 by a fraction of a period or by delaying the driver of the optical source.

FIG. 3 shows one example of setup configurations for this method using different parameters as a function of the distance. For different distances (for instance, for a range from 1 m to 100 m), one can optimize the temporal resolution, the number of accumulation and the refresh rate and make tradeoffs in terms of sensibility, accuracy and speed as a function of the distance to a target.

Figure 4:
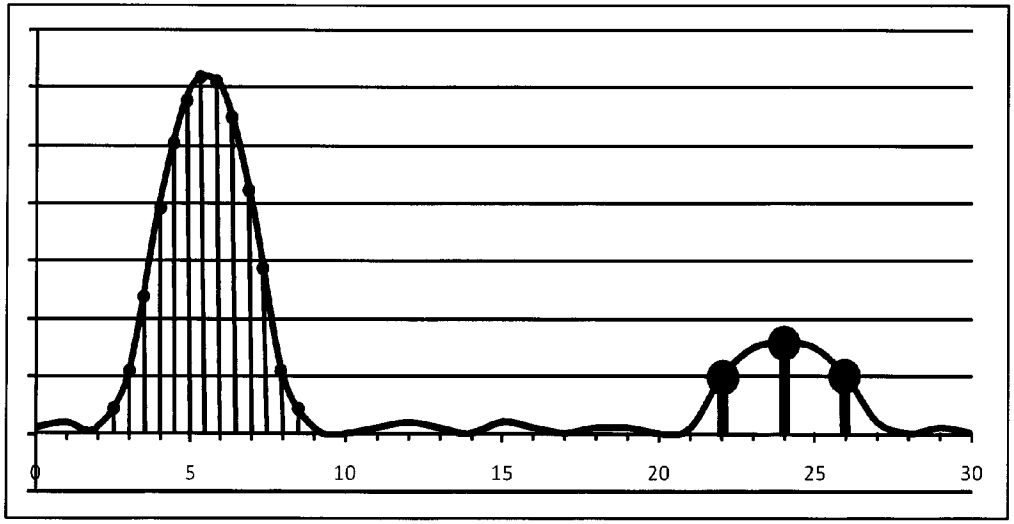
FIG. 4 shows an example of a reflected signal with adjusted parameters as a function of the distance.

FIG. 4 shows a reflected signal with a first echo from an object closer to the system and a second echo from another object further from the source. The amplitude of the first echo is higher and the system optimizes the temporal resolution. The amplitude of the second echo back pulse from the farther object is lower and the system optimizes the SNR by using more accumulation instead of optimizing the resolution.

The value of each parameter can be adaptive as a function of the echo back signal. After analyzing the level of the noise, the system can optimize the process by adjusting parameters as a function of the priority (resolution, refresh rate, SNR). For example, if the noise is lower than expected, the system can reduce the number of accumulation and increase the number of shift delays to improve the resolution.

Figure 5:
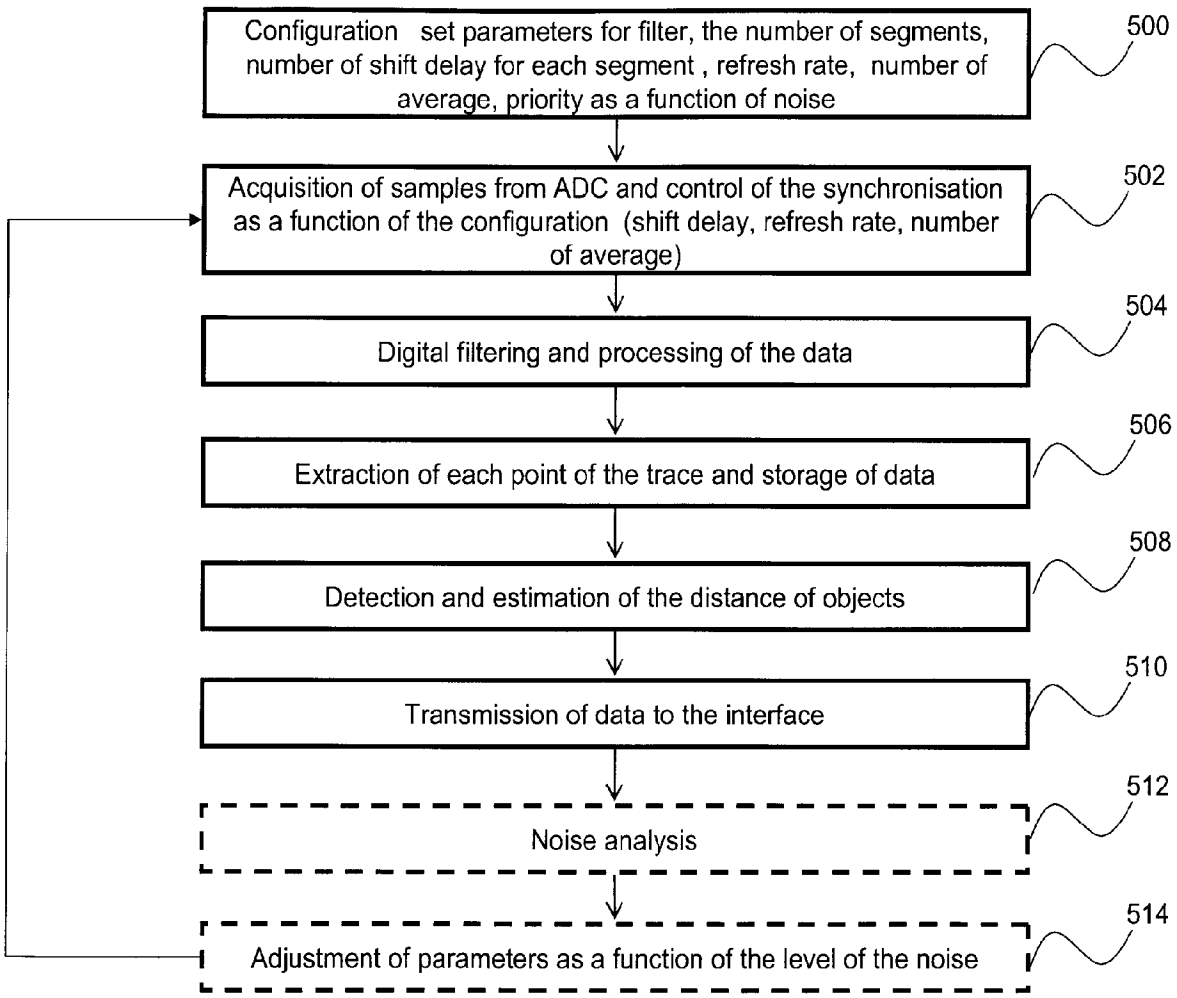
FIG. 5 is a flow chart of an embodiment of the segmentation process.

FIG. 5 shows a flow chart of a typical process for this method. In this flowchart and in all other flowcharts of the present application, some steps may be optional. Some optional steps are identified by using a dashed box for the step. Configuration 500 sets several parameters before the beginning of the process. Acquisition 502 starts the process by the synchronization of the emission of the optical pulses and the acquisition of samples by the ADC. Digital filtering and processing of the data 504 make the conditioning for the extraction and storage in memory of a lidar trace 506. Detection and estimation of the distance 508 is made, typically using a reference signal and measuring the lapse of time between the emission and the reception of the signal. The transmission of the results 510 (the detection and the estimation of the distance) are transmitted to a external system. Noise analysis 512 is performed and an adjustment of the parameters as a function of the level of the noise 514 can be made to optimize the process.

Figure 6:
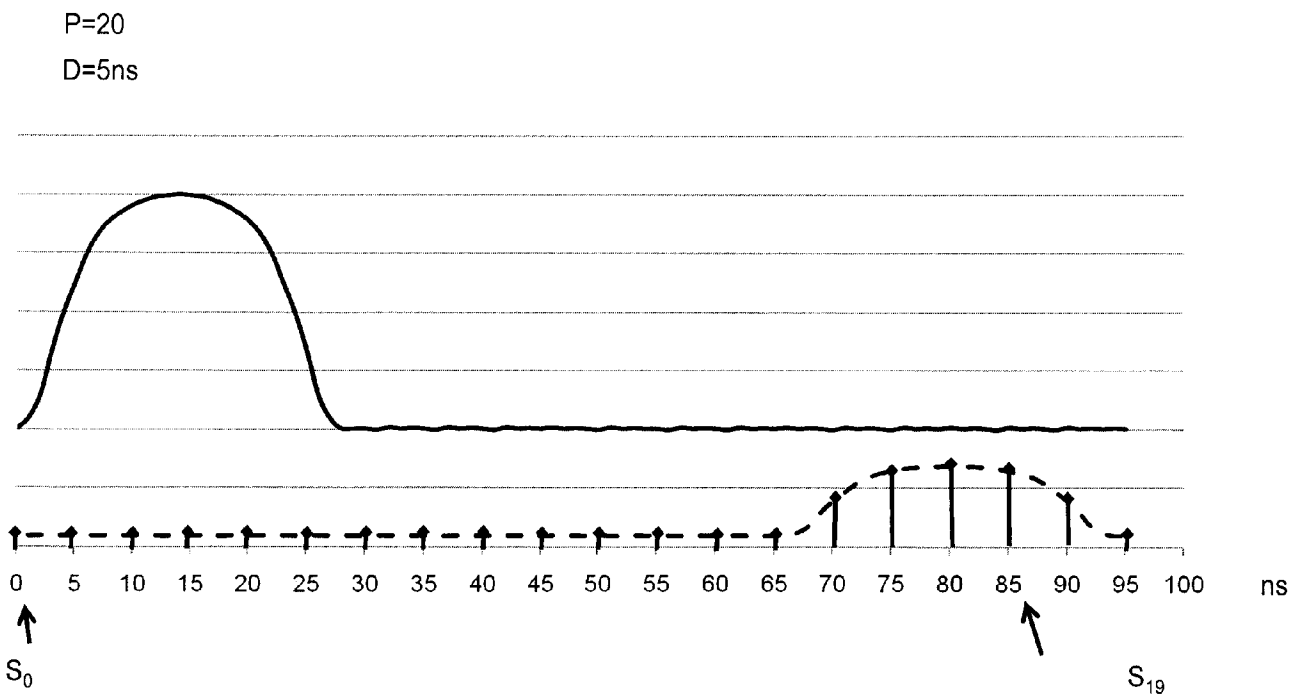
FIG. 6 shows an example of the accumulation and phase shift technique for a 10 m range finder using the one sample by optical pulse technique.

Based on shift delay and accumulation techniques, it is possible to optimize the cost of optical range finder systems particularly for short range distance measurement. By using only one sample per optical pulse, the ADC has to acquire samples at the frequency of the optical pulse emission. For a system driving optical pulses at L Hz, the ADC converts L samples per second with P shift delay of D ns of delay. FIG. 6 shows an example of that technique for a ten meter range finder. The source emits a 20 ns optical pulse at T=0 ns at several KHz (ex.: 100 KHz). In the air, the optical pulse takes approximately 65 ns to reach a target at ten meters and to reflect back to the sensor of the system. Each time a pulse is emitted, the ADC acquires only one sample. The ADC works at same frequency as the optical pulse driver (ex.: 100 KHz). For each one of the first twenty optical pulses, the system synchronizes a shift delay of 5 ns between the optical pulse driver and the ADC. After 20 pulses, the system samples the reflected back signal 95 ns after the pulse was emitted, just enough to detect the end of the reflected back signal from a target at 10 meters. For this example, if the system works at 100 KHz, after 200 us, a complete 10 meters Lidar trace is recorded. To improve the signal-to-noise ratio, one can accumulate up to 5000 times to have one complete lidar trace per second. FIG. 7 is a table showing setup configuration for this method. For a maximum range of 10 meters and 30 meters, the table shows tradeoffs between accuracy (temporal resolution), sensibility (improvement of the signal to noise ratio by accumulation) and speed (refresh rate).

Figure 8:
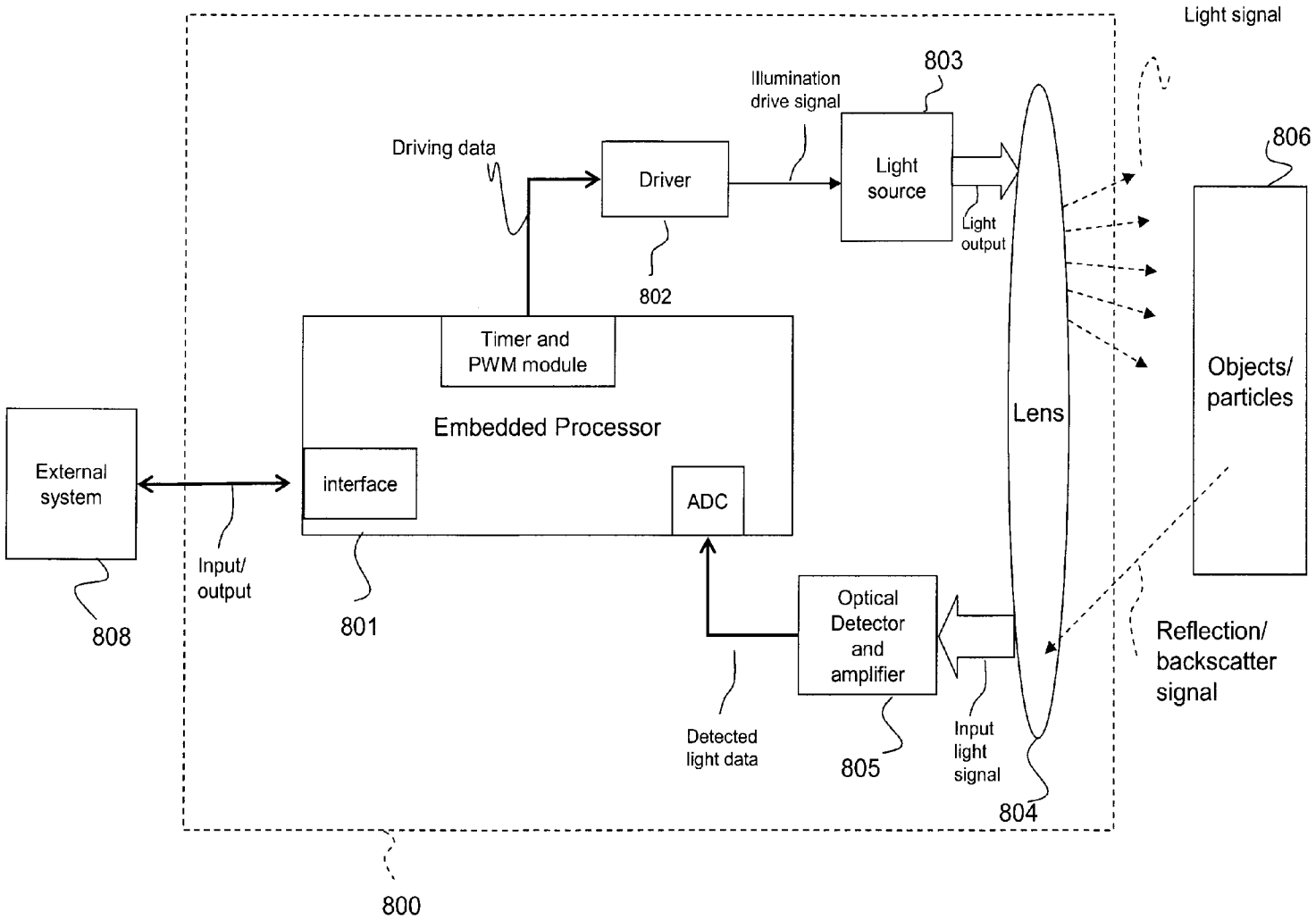
FIG. 8 is a block diagram of a lidar module using an embedded processor.

Nowadays, embedded processors, microcontrollers and digital signal processor, have a lot of processing power with fixed-point or floating-point units with hundreds of Mega FLOating point Operations per Second (MFLOPS) of performance. They are highly integrated with analog-to-digital converters, timers, PWM modules and, several types of interface (USB, Ethernet, CAN bus, etc). Using the last technique described, mainly because the requirement in terms of speed of the ADC is low, the major part of the range finder system can be integrated in an embedded processor. FIG. 8 shows a block diagram of a lidar module 800 using an embedded processor optimizing the cost of the range finder system. The embedded processor 801 controls the timing for the driver 802 sourcing the light source 803. A light signal is emitted in a direction determined by the optical lens 804. A reflection signal from objects/particles [834] *806* is received on the optical lens 804 and collected by the optical detector and amplifier 805. The embedded processor 801 uses an embedded ADC to make the acquisition of the lidar trace and processes the data and sends the information to an external system [840] *808*. The system 800 can use several sources being driven sequentially using one sensor or several sensors. The frequency of acquisition is at the frequency of optical source multiplied by the number of optical sources.

Moving Average, Filters, Frequency Analysis and Peak Detection

Instead of collecting N data and then performing an average (one average at each 1/N×[frequency of the source]), moving average techniques permit to constantly have the last N samples to perform an average. Using a FIFO by adding a new data and subtracting the first data accumulated is an example of an implementation of that technique.

Using too much integration time for averaging can generate a problem when detecting moving objects. Averaging techniques can consider a signal from moving objects as noise and will fail to discriminate it. Frequency domain analysis can be useful for this kind of situation. Wavelet transform is very efficient for signal analysis in time/frequency domain and is sensitive to the transient signals. By separating the echo back signal in several segments and analyzing the spectral frequency, the system can detect the frequency of the pulse of the source in a specific segment. Averaging parameters can be adjusted as a function of events detected by the spectral analysis process. For instance, the number of averages should be reduced when moving objects are detected sequentially in different segments.

Low pass filters can be used as pre-processes on each trace before averaging. Filters may be particularly efficient when more than one sample is available on an echo pulse. Information from noise analysis and from the information of the signal waveform emitted by the source can also help to discriminate a signal and to adjust the parameters. Specific processing functions can be used for each point of the trace or by segment.

Another way to optimize the detection of an object and the measurement of the distance is using a reference signal and making a fit with the lidar trace. The reference signal can be a pattern signal stored in memory or a reference reflection signal of an optical pulse detected by a reference optical detector. This reference optical detector acquires a reference zero value and this reference signal is compared to the lidar trace. Detection and distance is based on comparison between both signals. Fit can be made by convolution.

Figure 9:
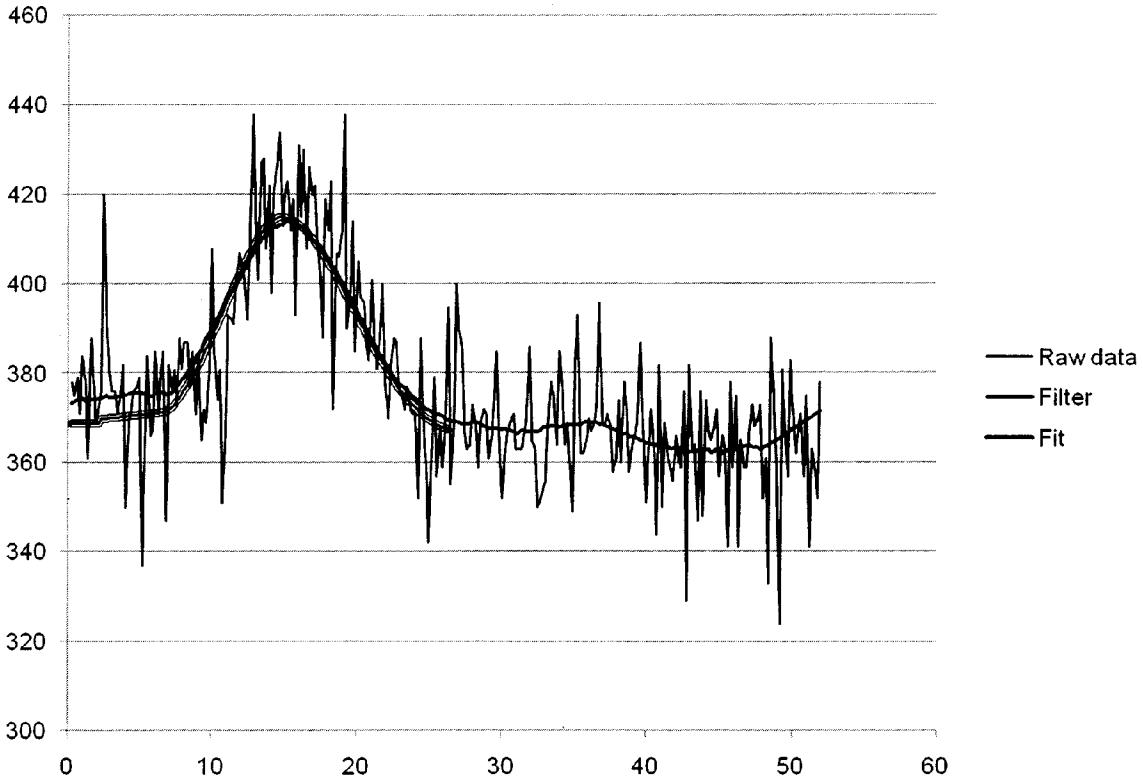
FIG. 9 shows a noisy signal fitted and filtered.

FIG. 9 shows a noisy signal fitted and filtered to diminish the effects of the noise. FIG. 9 presents the effect of signal filtering and curve fitting. The raw data curve is the noisy signal as received from the sensor. The filter curve is the raw data curve after filtering by correlation with an ideal (no noise) pulse. This removes the high-frequency noise. Finally the fit curve presents the optimal fitting of an ideal pulse on the filtered signal. Fitting can improve distance stability especially when the signal is weak and still too noisy even after filtering.

When a signal waveform has a Gaussian profile, it is possible to use a method based on a zero-crossing point of the first derivative to detect the peak of the waveform. This technique requires a previous filtering to remove the noise. When the detection of an event (echo back pulse from an object) occurs, the system will detect N consecutive points over a predetermined threshold. The value of N depends notably on the sample rate and the width of the pulse from the source. By computing the first derivative of those selected points and interpolating to find the zero-crossing point, an estimation of the peak of the signal can be found.

Figure 10:
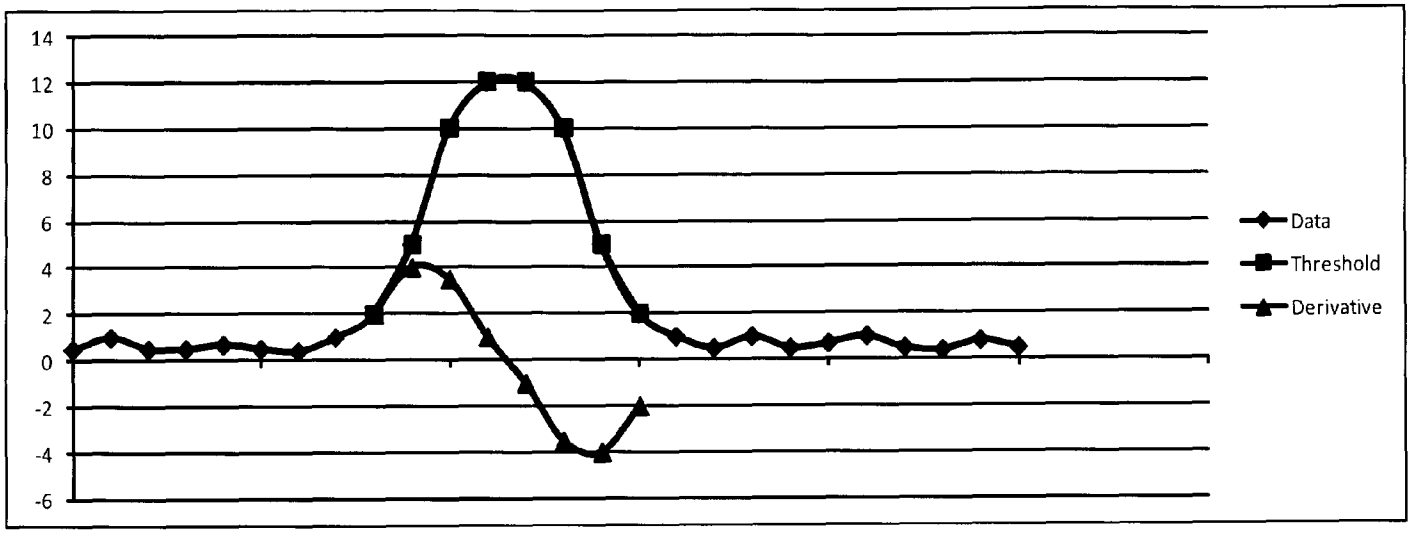
FIG. 10 presents a Gaussian pulse with a zero-crossing point of the first derivative.

FIG. 10 shows an example of a Gaussian pulse with selected data over a predefined threshold and the result from the derivative calculation of those selected data. One can see the zero crossing from the derivative plot representing the peak of the pulse.

Illumination Driver as a Source for Rangefinder with Edge Detection

Figure 11:
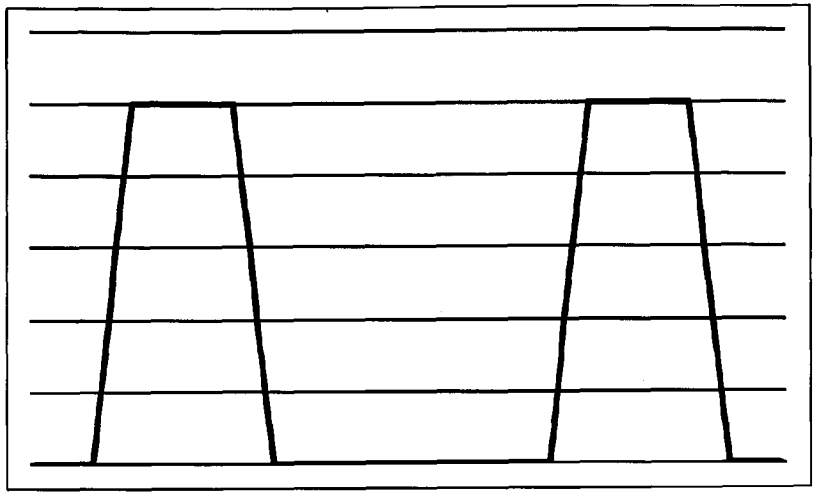
FIG. 11 shows a typical PWM pattern with slope adjustment.

Switch-mode LED drivers are very useful notably for their efficiency compared to linear drivers. PWMs permit a very high dimming ratio without drifting the wavelength usually generated by linear drivers. Their performance is particularly well suited for high power LEDs. However, switch-mode LED drivers are noisier and the EMI can be an issue for some applications. One way to address this issue is to use a gate rising/falling slope adjust circuit to decrease the speed of transitions. Transitions at lower speed mean less EMI. FIG. 11 presents a typical PWM signal with slope adjustment.

For range-finding applications, the rapid transition of the signal is generally required. Usually, to get good performance, electronic circuits need to detect fast transition signals within a few nanosecond of resolution. Using a LED light source with a PWM driver with adjustment to diminish the speed of the slope as the source for detection and ranging is, in principle, not very helpful.

One solution is to use the same LED light source for illumination and for detection and ranging with a PWM circuit controlling the intensity of illumination. The PWM LED light source has a relatively constant slope during its rising/falling edge to reduce EMI (rising/falling edge of 100 ns for example). The optical signal from the source is sampled to be able to determine the starting time of the pulse (T0). Electrical synchronization signal can also be used to indicate the starting point. The reflected signal is sampled with enough temporal resolution to have several points during the slope of the signal when an object in the field of view returns a perceptible echo.

Figure 12:
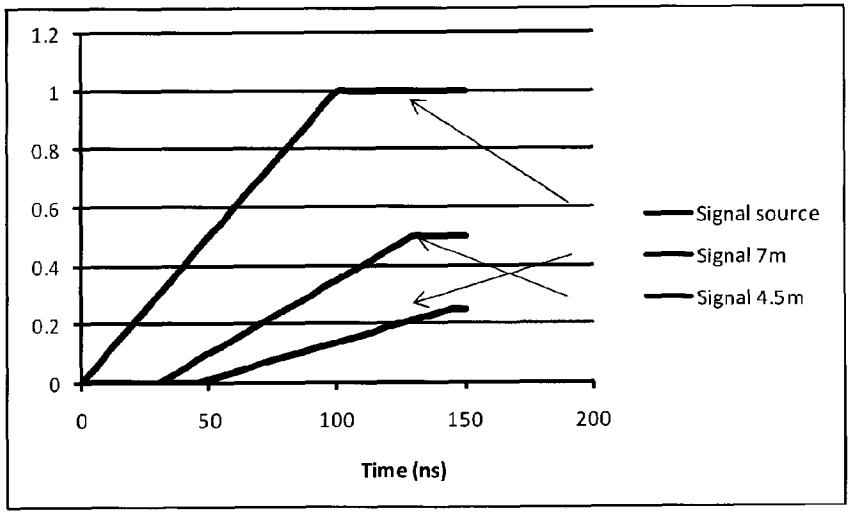
FIG. 12 shows a rising edge signal from a source and reflected signals.

FIG. 12 shows an example of a rising edge from a source, an echo back signal from an object 4.5 meters away from the source (≈30 ns later) and another from an object at 7 meters from the source (≈45 ns later). Calculating the slope by linear regression or other means, an evaluation of the origin of the signal is made and the elapsed time between the signal from the source and an echo back signal can be determined. Based on that result, one can estimate the presence and the distance of the object reflecting the signal.

Figure 13:
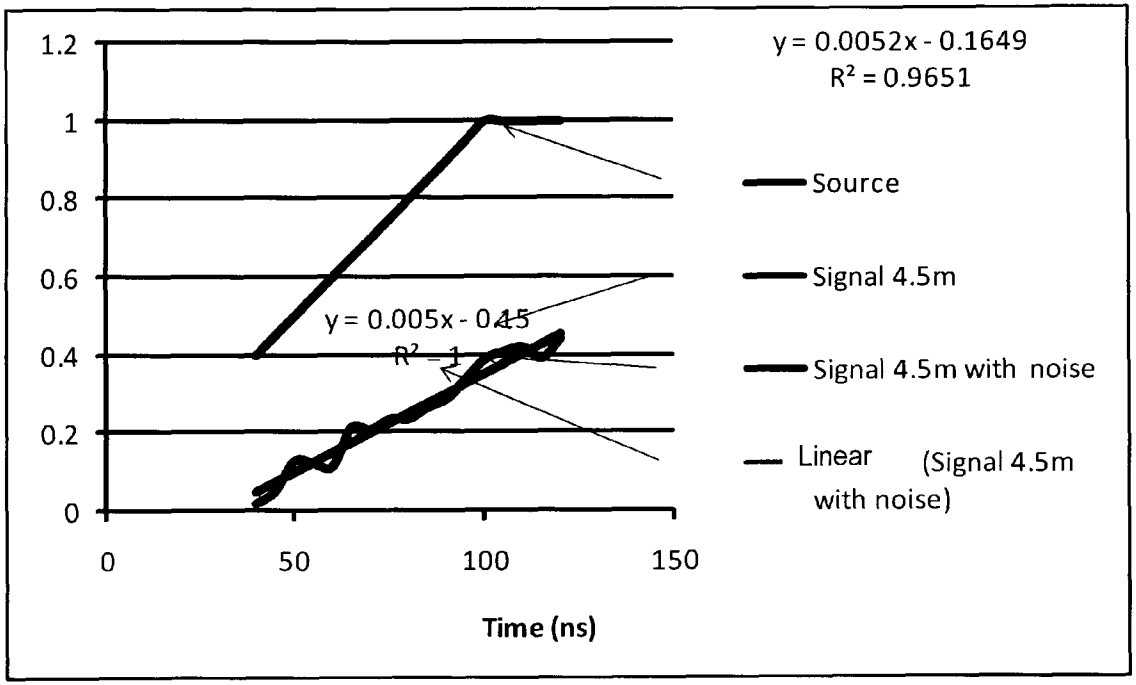
FIG. 13 shows a 10% to 90% rising edge of an echo back noisy signal with linear regression.

FIG. 13 represents a 10% to 90% rising edge of an echo back noisy signal from an object at 4.5 meters from the source. With linear regression, one can calculate the intercept point and get a good estimate of the delay between the two signals. Samples close to the end of the slope have a better SNR. One can determine different weights in the calculation as a function of the level of the noise. Both rising and falling edges can be used. During the calibration process, a threshold can be set to discriminate the presence or the absence of an object. Averaging and filtering techniques can be used to diminish the level of noise and shifting techniques can also be used to have more points in the slope. As shown in FIG. 9, even with a noisy signal, this method can give good results.

Figure 14:
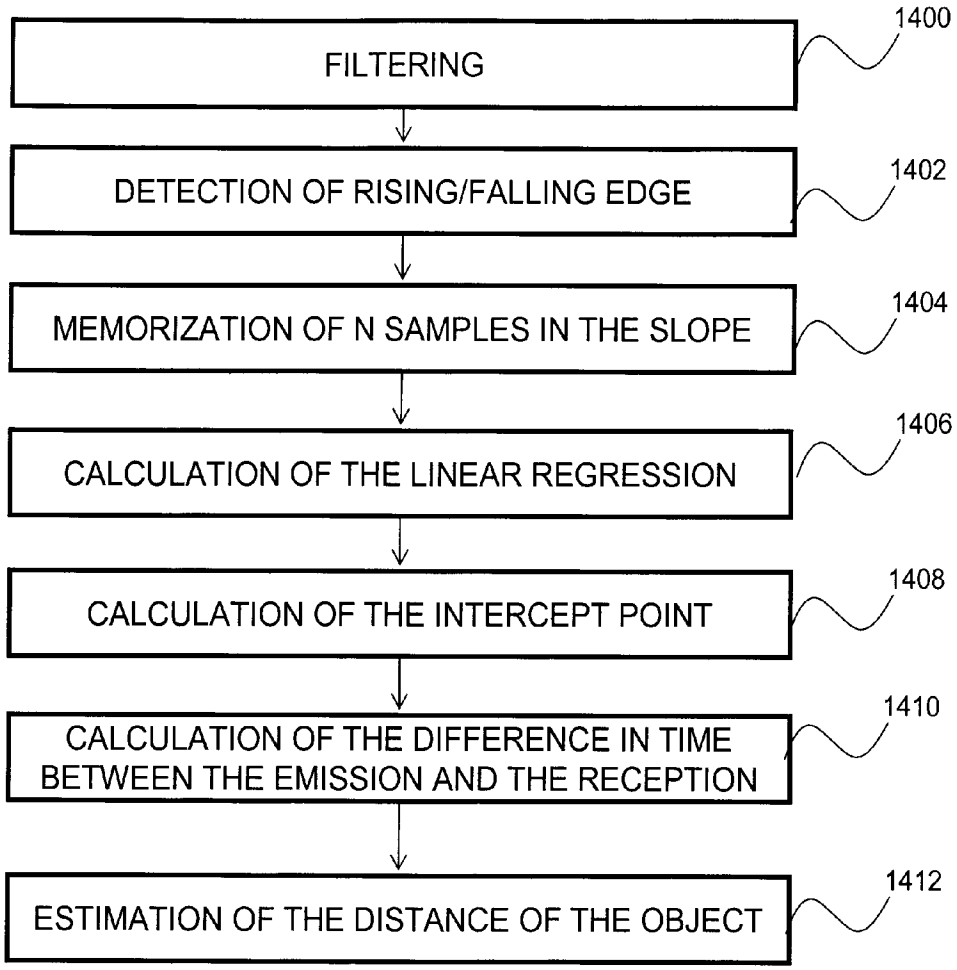
FIG. 14 is a flow chart of an embodiment of the PWM edge technique for detection and ranging.

FIG. 14 shows a flow chart of the typical process for this method. The echo back signal is filtered 1400, typically using a band-pass filter based on the frequency of the transition. Rising and falling edges are detected 1402 and samples are taken in the slope 1404 to memorize a digital waveform of the slope. The calculation of the linear regression 1406 is made and permits to calculate the intercept point 1408. Based on that information, the calculation of the difference in time between the signal emission and the signal received 1410 allows to estimate the distance to the object 1412.

This method can be improved by using demodulation and spectral analysis techniques. The base frequency of the PWM can be demodulated and the result of this demodulation will give an indication of a presence of an object. By selecting a frequency based on an harmonic coming from the slopes of the PWM signal, one can estimate the position of the object by spectral analysis of different segments. Knowing the approximated position, the acquisition of samples will be adjusted to target the rising and the falling edge.

By using the edge detection technique, one can use a standard LED driver for the purpose of lighting and also for the purpose of detection and ranging. The frequency of the PWM might be in the range from a few KHz up to 1 MHz. High frequency modulation can improve the SNR notably by averaging techniques. When the optical output of the source is coupled by optical path (reflection from lens or mirror or use of fiber optic), this method permits using a PWM source for a LED lighting system completely electrically isolated from the receiver.

Figure 15:
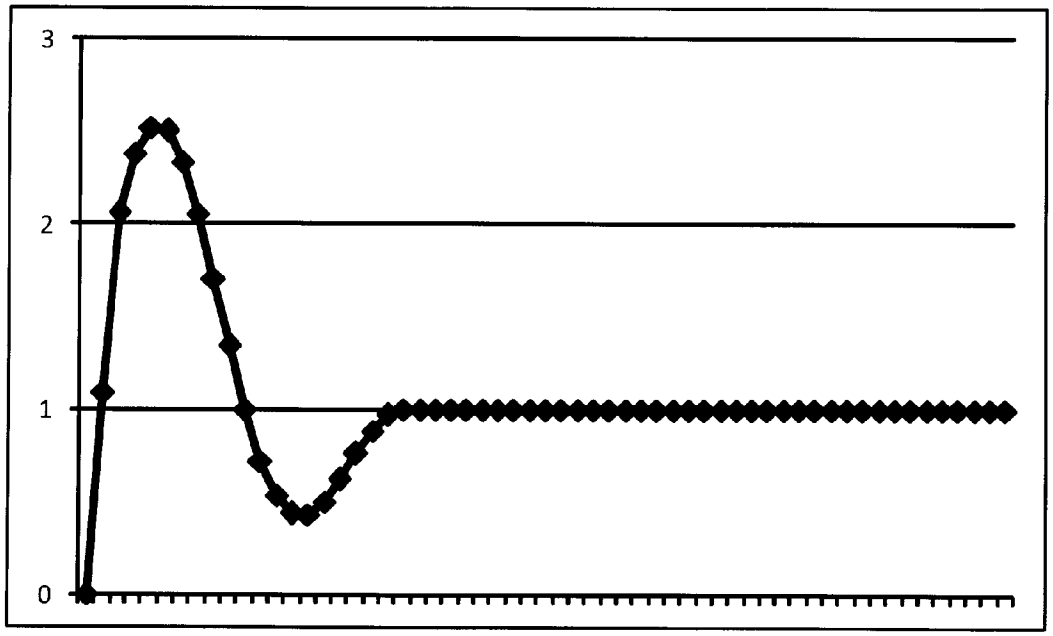
FIG. 15 shows a rising edge with overshoot stabilizing after one cycle of the resonance frequency.

Other types of rising/falling edge detection can be used with this method with the appropriate curve fitting technique. If EMI is not an issue, the electronic driver can generate a fast rising edge and/or falling edge with some overshoot at a resonance frequency. This signal adds more power at a specific frequency and increase the signal that can be detected by the receiver. FIG. 15 shows a rising edge with overshoot stabilizing after one cycle of the resonance frequency.

Recognition of Predetermined Patterns

Different shapes of objects reflect a modified waveform of the original signal. The echo back signal from a wall is different when compared to the echo back signal from an object with an irregular shape. Reflection from two objects with a short longitudinal distance between them also generates a distinct waveform. By memorizing in database a several types of waveforms, this data can be used to improve the digital processing performance. Digital correlation can be done to detect a predetermined pattern.

Tracking

Averaging techniques do not perform very well with moving objects. By tracking a moving object, one can anticipate the position of the object and adapt to the situation. Averaging with shifting proportional to the estimated position is a way to improve the SNR even in the case of moving objects. Tracking edges is another way to adjust the acquisition of the waveform with more points in the region of interest. Spectral analysis can also be used to lock and track an object.

Weather Information and Condition Monitoring

The system can be used as a road weather information system (RWIS) and thus provide information about temperature, visibility (fog, snow, rain, dust), condition of the road (icy) and pollution (smog). Pattern recognition based on low frequency signals and spikes can be implemented to do so. The recognition of bad weather condition patterns helps to discriminate noise from objects. The system can be used to adjust the intensity of light depending on weather conditions. Monitoring the condition of the lens is also possible (dirt, accumulation of snow, etc). This monitoring can be done by the measurement of the reflection on the lens from the source or from an auxiliary source.

Detection Based on Integration Time

Figure 16:
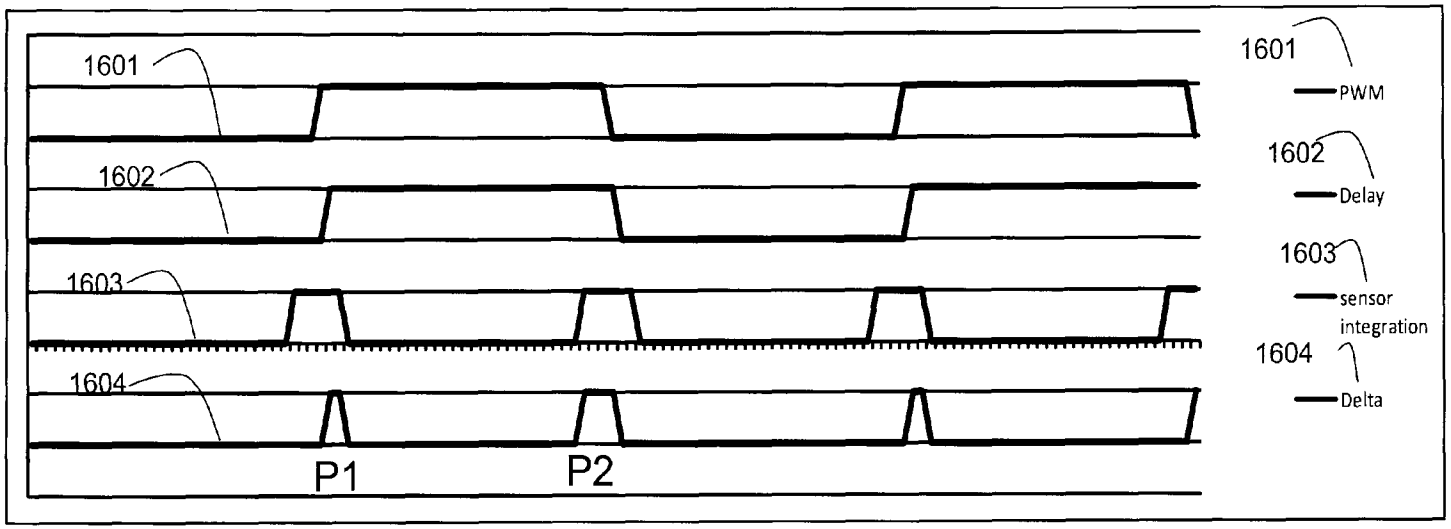
FIG. 16 shows a timing diagram of the method using an integration signal from the reflected signal and synchronized with rising edge and falling edge of the PWM lighting source.

FIG. 16 shows a timing diagram of the method using an integration signal from the reflected signal and synchronized with the rising edge and the falling edge of the PWM lighting source.

This method uses a sensor or an array of sensors (1D or 2D array—CCD, CMOS) with an integrator, or electronic shutter, and a PWM light source or a pulsed auxiliary light source. FIG. 16 shows a PWM signal (PWM curve 1601) with an adjustable duty cycle to control the intensity of light for illumination purposes. Before the rising edge of the PWM pulse, at time t−x, the sensor starts the integration (sensor integration curve 1603) of the reflected signal. At time t+x, the sensor stops the integration. The same process is performed at the falling edge of the PWM. The light pulse from the source is delayed (delay curve 1602) proportionally to the travelled distance. The delta curve 1604 shows that the integration P1 for the rising edge is smaller than the integration P2 for the falling edge because of the delay of travel of the light signal. In fact, if an object is very close to the source, the integration value from the rising edge will be approximately equal to the integration value from the falling edge. But, if an object is further, the integration value of rising edge will be less than the integration value of the falling edge. The difference between the values is proportional to the distance. The relationship is:

$$\text{Distance}=c\times(\text{INT}/4)*(P2-P1)/(P2+P1),$$

where c represents the velocity of light, INT represents the integration time, P1 represents the integration value synchronized with the rising edge of the optical pulse and P2 represents the integration value synchronized on the falling edge of the optical pulse.

When an illumination background from other lighting sources is not negligible, measurement of the background B during an integration time INT when the optical source of the system is off can be made and subtracted from each integration value P1 and P2. The relationship with non negligible background is:

$$\text{Distance}=c\times(\text{INT}/4)*((P2-B)-(P1--B))/(P2+P1-2B),$$

where B is the integration value of the optical background level when the optical source of the system is off.

In the case where the integration time is larger than the width of the pulse of the optical source, the same technique can be used by switching the synchronisation of the signal of the optical source and the signal to the sensor integration time. The result becomes:

$$\text{Distance}=c\times(\text{INT}/4)*(P1-P2)/(P2+P1),$$

where c represents the velocity of light, INT represents the integration time, P1 represents the integration value when optical pulse is synchronized with the rising edge of integration and P2 represents the integration value when the optical pulse is synchronized with the falling edge of integration.

When an illumination background from other lighting sources is not negligible, the relationship is:

$$\text{Distance}=c\times(\text{INT}/4)*((P1-B)-(P2-B))/(P2+P1-2B).$$

Values from the signal integration are memorized. In the case of an array of sensors, each "pixel" is memorized. Several integrations can be performed and an averaging process can be done to improve signal to noise ratio. In the case of an array, we also can improve signal to noise ratio by using a groups of pixel and combining them to form a larger pixel (binning)

Figure 17:
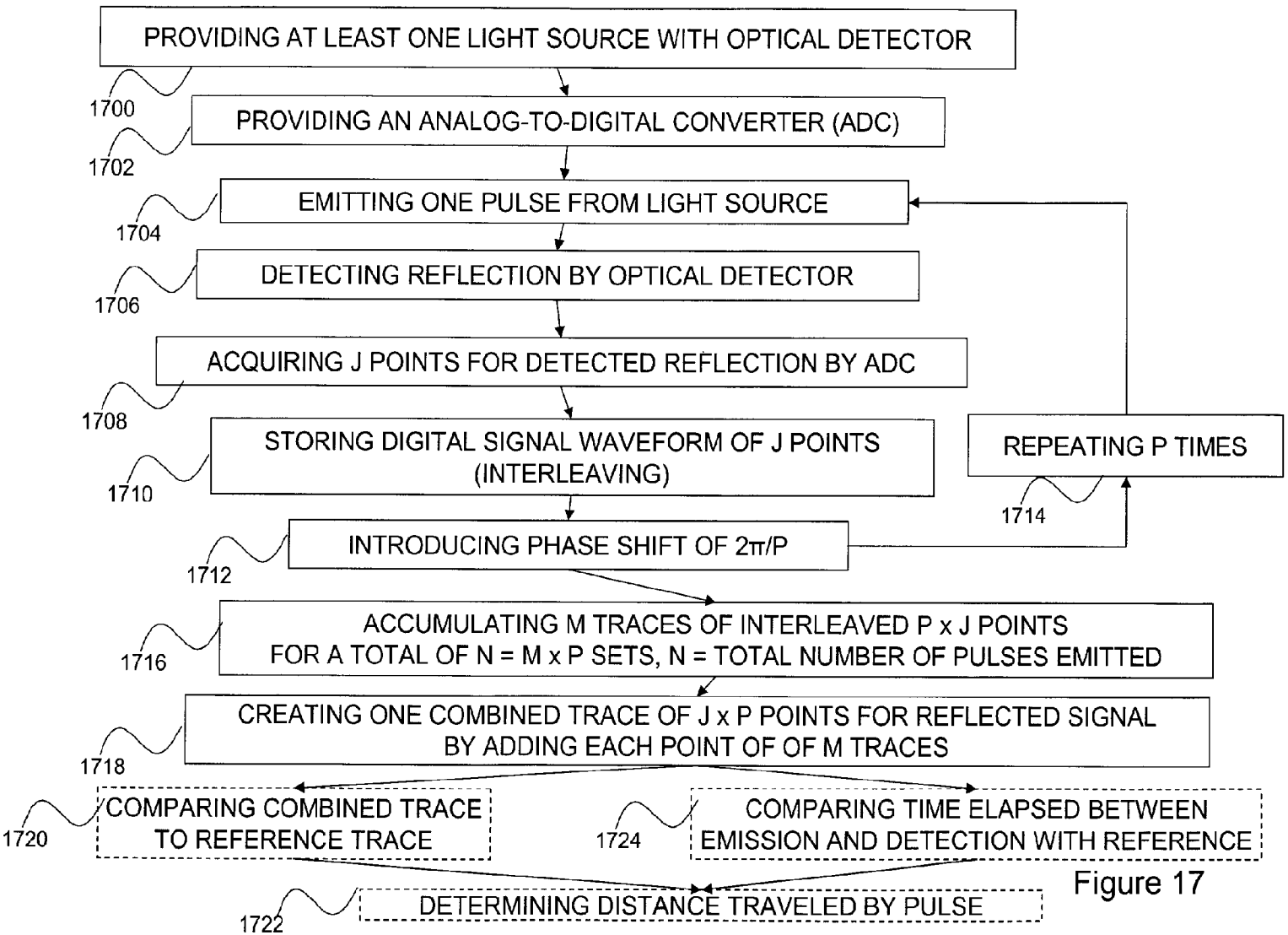
FIG. 17 is a flow chart of the main steps of a method for acquiring a detected light optical signal and generating an accumulated digital trace.

In summary, with reference to FIG. 17, the main steps of the method for acquiring a detected light optical signal and generating an accumulated digital trace are shown. The method comprises providing a light source with an optical detector for illumination of a field of view 1700; providing an analog-to-digital converter (ADC) 1702; emitting one pulse from the light source in the field of view 1704; detecting a reflection signal of the pulse by the optical detector 1706; acquiring j points for the detected reflection signal by the ADC 1708; storing, in a buffer, the digital signal waveform of j points 1710; introducing a phase shift of $2\pi/P$ 1712; repeating, P times 1714, the steps of emitting 1704, detecting 1706, acquiring 1708, storing 1710 and introducing 1712 to store 1710, in the buffer, an interleaved waveform of P×j points; accumulating 1716 M traces of interleaved P×j points for a total of N=M×P acquisition sets, N being a total number of pulses emitted; creating one combined trace of the reflected signal of j×P points by adding each point of the M traces 1718.

Additionally, the combined trace can be compared 1720 to a detected reference reflection signal of the pulse to determine 1722 a distance traveled by the pulse.

Alternatively, a timer can be triggered to calculate a time elapsed 1724 between the emission of the pulse and the detection of the reflection signal to determine a distance traveled 1722 by the pulse based on the time elapsed.

Figure 18:
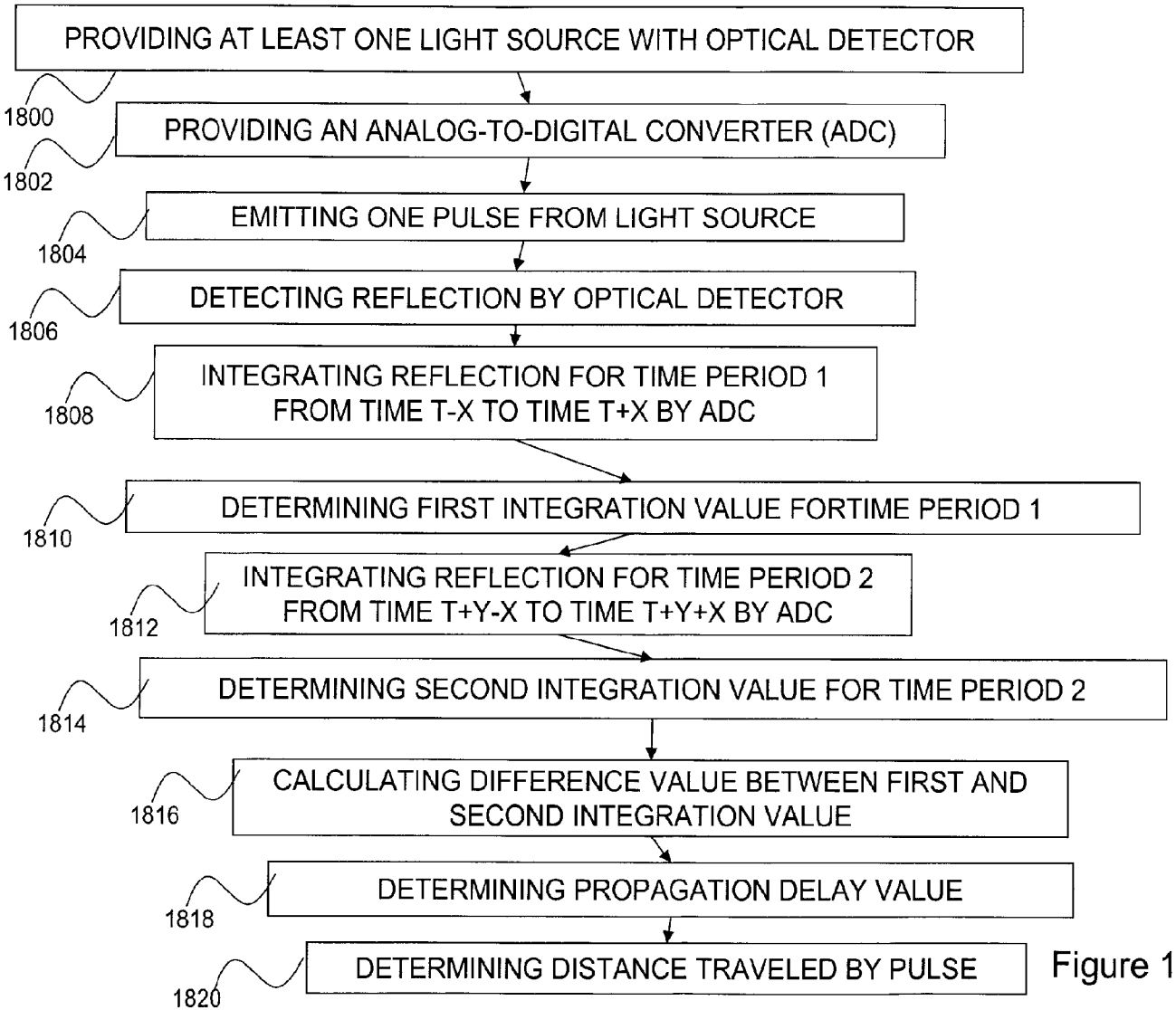
FIG. 18 is a flow chart of the main steps of a method for detecting a distance to an object.

In summary, with reference to FIG. 18, the main steps of the method for detecting a distance to an object are shown. The method comprises providing a lighting system 1800 having at least one pulse width modulated visible-light source for illumination of a field of view; emitting an illumination signal 1802 for illuminating the field of view for a duration of time y using the visible-light source at a time t; integrating a reflection energy for a first time period from a time t−x to a time t+x 1808; determining a first integration value for the first time period 1810; integrating the reflection energy for a second time period from a time t+y−x to a time t+y+x 1812; determining a second integration value for the second time period 1814; calculating a difference value between the first integration value and the second integration value 1816; determining a propagation delay value proportional to the difference value 1818; determining the distance to the object from the propagation delay value 1820.

While illustrated in the block diagrams as groups of discrete components communicating with each other via distinct data signal connections, it will be understood by those skilled in the art that the illustrated embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the described embodiment.

What is claimed is:

[1. A method for detecting a distance to an object, comprising:

providing a lighting system having at least one pulse width modulated visible-light source for illumination of a field of view;

emitting an illumination signal for illuminating said field of view for a duration of time y using said visible-light source at a time t, said time t being a center of a transition from a non-illuminated state to an illuminated state of said field of view, for at least one pulse;

starting an optical sensor for integrating a reflection energy captured by said visible-light source, of a reflection of said illumination signal, for a first time period at a time t−x of a first one of said at least one pulse;

stopping said optical sensor for said first time period at a time t+x for said first one of said at least one pulse and determining a first integration value for said first time period;

starting said optical sensor for integrating said reflection energy captured by said visible-light source, of said reflection of said illumination signal, for a second time period at a time t+y−x for a second one of said at least one pulse, said second one being one of said first one and another one of said at least one pulse, y being greater than x;

stopping said optical sensor for said second time period at a time t+y+x for said second one of said at least one pulse and determining a second integration value for said second time period;

measuring a background integration value for non-negligible illumination background from other lighting sources during an integration time 2x when said visible-light source is not emitting;

subtracting from each said first integration value and said second integration value said background integration value to obtain background compensated first integration value and second integration value;

calculating a difference value between said background compensated first integration value and said background compensated second integration value;

determining a propagation delay value proportional to said difference value;

determining said distance to said object from said propagation delay value.]

[2. A method as claimed in claim 1, further comprising:

providing a threshold distance to a pre-identified object;

comparing said distance to said object with said threshold distance;

determining said object to be said pre-identified object if said comparison is positive.]

[3. A method as claimed in claim 1, further comprising, when said x is greater than said y, said integrating being larger than a width of the pulse, switching a synchronisation of said illumination signal with said starting said optical sensor.]

*4. A ranging system comprising:*

*a. a driver circuit configured to produce a driving signal for causing a light source to emit pulsed light toward a scene containing an object,*

*b. an optical detector configured to collect pulsed light emitted from the light source and back-scattered from the object and to produce an output signal conveying acquisitions of light pulses,*

*c. an adaptive signal processing system coupled to the optical detector, configured to perform an adaptive processing of the output signal, including:*

*(i) sampling the output signal to obtain sampled acquisitions of light pulses,*

*(ii) performing an accumulation of a number of the sampled acquisitions of light pulses to define an accumulated digital signal varying with time, the accumulation of the number of the sampled acquisitions of light pulses including performing integration over time of the number of sampled acquisitions of light pulses,*

*(iii) varying the number of accumulated sampled acquisitions of light pulses to obtain a modified accumulated digital signal, based on a parameter of the object,*

*(iv) obtaining a distance measurement from the modified accumulated digital signal.*

*5. The ranging system of claim 4, wherein the accumulated digital signal defines a signal trace with a pulse-shaped segment.*

*6. The ranging system of claim 5, wherein the signal processing system is configured for adjusting an intensity of the driving signal based on the estimated distance to the object.*

*7. The ranging system of claim 5, wherein the light is non-visible light.*

*8. The ranging system of claim 4, wherein the parameter of the object includes a distance to the object, the processing*

*of the output signal comprises increasing the number of accumulated sampled acquisitions of light pulses to obtain a distance measurement, with an increasing distance to the object.*

*9. The ranging system of claim 4, wherein the parameter of the object includes a distance to the object, the processing of the output signal comprises decreasing the number of accumulated sampled acquisitions of light pulses to obtain a distance measurement, with a decreasing distance to the object.*

*10. The ranging system as defined in claim 4, wherein the optical detector comprises an array of pixels, each pixel outputting a respective output signal.*

*11. The ranging system as defined in claim 10, wherein the array is a 2D array.*

*12. The ranging system as defined in claim 11, wherein the array is a 1D array.*

*13. The ranging system as defined in claim 4, wherein the sampled acquisitions of light pulses include respective sets of j points, the accumulation of the number of sampled acquisitions of light pulses including adding the number of sets of j points, point by point to generate the accumulated digital signal.*

*14. The ranging system as defined in claim 13, wherein the processing of the output signal includes phase-shifting the sampled acquisitions of light pulses.*

* * * * *